United States Patent
Noh et al.

(10) Patent No.: US 9,312,999 B2
(45) Date of Patent: *Apr. 12, 2016

(54) METHOD AND APPARATUS FOR TRANSMITTING UPLINK REFERENCE SIGNAL IN A MULTI-ANTENNA WIRELESS COMMUNICATION SYSTEM

(71) Applicant: LG ELECTRONICS INC., Seoul (KR)

(72) Inventors: Minseok Noh, Anyang-Si (KR);
Jaehoon Chung, Anyang-Si (KR);
Hyunsoo Ko, Anyang-Si (KR);
Seunghee Han, Anyang-Si (KR);
Moonil Lee, Anyang-Si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/919,697

(22) Filed: Jun. 17, 2013

(65) Prior Publication Data

US 2013/0279447 A1 Oct. 24, 2013

Related U.S. Application Data

(63) Continuation of application No. 13/169,293, filed on Jun. 27, 2011.

(60) Provisional application No. 61/362,694, filed on Jul. 9, 2010.

(30) Foreign Application Priority Data

Mar. 31, 2011 (KR) .................. 10-2011-0029461

(51) Int. Cl.
| | |
|---|---|
| *H04L 5/00* | (2006.01) |
| *H04L 1/18* | (2006.01) |
| *H04W 72/14* | (2009.01) |
| *H04L 25/03* | (2006.01) |
| *H04W 72/04* | (2009.01) |
| *H04B 7/04* | (2006.01) |
| *H04W 28/04* | (2009.01) |
| *H04L 7/04* | (2006.01) |

(52) U.S. Cl.
CPC ............ *H04L 5/0048* (2013.01); *H04L 1/1861* (2013.01); *H04L 1/1893* (2013.01);
(Continued)

(58) Field of Classification Search
None
See application file for complete search history.

(56) References Cited

U.S. PATENT DOCUMENTS

| | | | |
|---|---|---|---|
| 8,295,236 | B2 | 10/2012 | Ishii et al. |
| 8,503,425 | B2 | 8/2013 | Chung et al. |

(Continued)

FOREIGN PATENT DOCUMENTS

| | | |
|---|---|---|
| CN | 101669399 A | 3/2010 |
| EP | 2 293 461 A1 | 3/2011 |
| JP | 2013-537734 A | 10/2013 |
| KR | 10-2009-0092708 A | 9/2009 |

(Continued)

OTHER PUBLICATIONS

Qualcomm Incorporated, "Conveying OCC for PUSCH Transmissions", May 2010, R1-102764.

(Continued)

*Primary Examiner* — Jackie Zuniga Abad
(74) *Attorney, Agent, or Firm* — Birch, Stewart, Kolasch & Birch, LLP

(57) ABSTRACT

A method and apparatus for transmitting a Reference Signal (RS) during retransmission at a User Equipment (UE) in a multi-antenna wireless communication system are disclosed. The RS transmission method includes receiving an uplink grant from a Base Station (BS), initially transmitting data and an RS corresponding to each layer based on the uplink grant, receiving ACKnowledgment/Negative ACKnowledgment (ACK/NACK) information for the initially transmitted data, and retransmitting the RS corresponding to each layer and the data according to the ACK/NACK information. The retransmission includes initializing a cyclic shift value for the RS corresponding to each layer according to a cyclic shift field for RSs included in the uplink grant.

16 Claims, 16 Drawing Sheets

(52) U.S. Cl.
CPC ........ *H04L5/0055* (2013.01); *H04L 25/03343* (2013.01); *H04W 72/04* (2013.01); *H04W 72/042* (2013.01); *H04W 72/14* (2013.01); *H04B 7/0413* (2013.01); *H04L 5/0007* (2013.01); *H04L 7/041* (2013.01); *H04W 28/04* (2013.01)

(56) References Cited

U.S. PATENT DOCUMENTS

| 8,520,658 | B2 | 8/2013 | Luo et al. |
| 2009/0042616 | A1 | 2/2009 | Teo et al. |
| 2010/0034312 | A1 | 2/2010 | Muharemovic et al. |

FOREIGN PATENT DOCUMENTS

| KR | 10-2010-0066255 A | 6/2010 |
| WO | WO 2009045011 A1 | 4/2009 |
| WO | WO 2010/011083 A2 | 1/2010 |
| WO | WO 2010/058943 A2 | 5/2010 |

OTHER PUBLICATIONS

Samsung, "UL SU-MIMO precoding in PHICH-triggered retransmissions", 3GPP TSG RAN WG1 #61, R1-103035, Montreal, Canada, May 10-14, 2010, 4 pages.

ZTE, "Precoding for UL SU-MIMO in PHICH-triggered retransmission," 3GPP TSG-RAN WG1#61bis, Jun. 28-Jul. 2, 2010, pp. 1-3, R1-103606.

FIG. 2
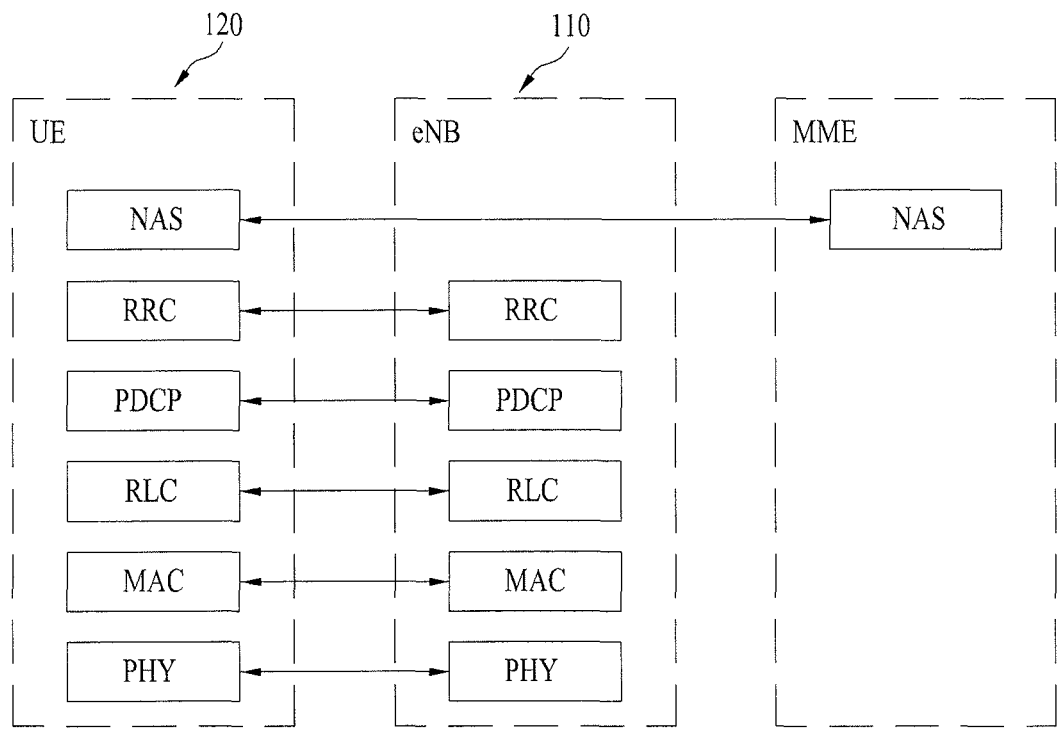
(a) CONTROL-PLANE PROTOCOL STACK
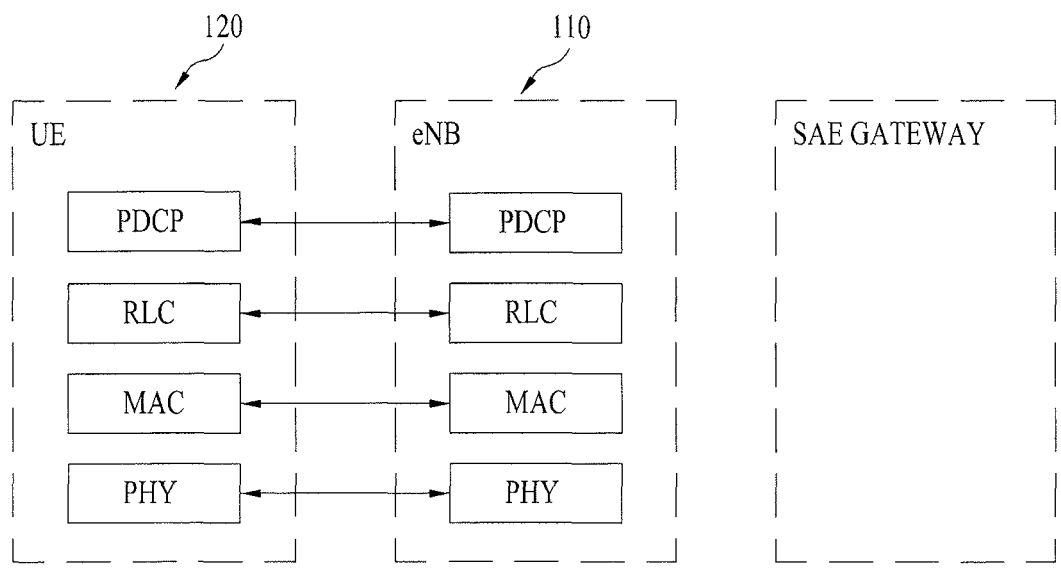
(b) USER-PLANE PROTOCOL STACK

METHOD AND APPARATUS FOR TRANSMITTING UPLINK REFERENCE SIGNAL IN A MULTI-ANTENNA WIRELESS COMMUNICATION SYSTEM

CROSS REFERENCE TO RELATED APPLICATIONS

This application is a Continuation of co-pending application Ser. No. 13/169,293 filed Jun. 27, 2011, which claims the benefit of the U.S. Provisional Application 61/362,694, filed on Jul. 9, 2010, and Korean Patent Application No. 10-2011-0029461, filed on Mar. 31, 2011, which are hereby incorporated by reference as if fully set forth herein.

BACKGROUND OF THE INVENTION

1. Field of the Invention

The present invention relates to a wireless communication system, and more particularly, to a method and apparatus for transmitting an uplink Reference Signal (RS) to a Base Station (BS) at a User Equipment (UE).

2. Discussion of the Related Art

A $3^{rd}$ Generation Partnership Project Long Term Evolution (3GPP LTE) communication system will be described below as an exemplary mobile communication system to which the present invention is applicable.

FIG. 1 illustrates the configuration of an Evolved Universal Mobile Telecommunications System (E-UMTS) network as an example of a mobile communication system. The E-UMTS system is an evolution of the legacy UMTS system, under standardization in 3GPP. E-UMTS is also called LTE. For details of the technical specifications of UMTS and E-UMTS, Release 7 and Release 8 of "$3^{rd}$ Generation Partnership Project; Technical Specification Group Radio Access Network" can be referred to, respectively.

Referring to FIG. 1, the E-UMTS system includes a UE, evolved Node Bs (eNode Bs or eNBs), and an Access Gateway (AG) located at an end of an E-UTRAN and connected to an external network. An eNode B can simultaneously transmit a plurality of data streams for multicast service and/or unicast service.

An eNode B covers one or more cells. Each cell is set to one of the bandwidths of 1.25, 2.5, 5, 10, 15 and 20 MHz and provides downlink or uplink transmission service to a plurality of UEs in its bandwidth. Different bandwidths may be allocated to different cells. The eNode B controls data transmission and reception to and from the plurality of UEs. Regarding downlink data, the eNode B notifies a UE of an allocated time/frequency area, a coding scheme, a data size, and Hybrid Automatic Repeat reQuest (HARQ) information. Regarding uplink data, the eNode B transmits information about an allocated time/frequency area, a coding scheme, a data size, and HARQ information to a UE that is to transmit the uplink data to the eNode B. An interface may be established between eNode Bs, for transmitting user traffic or control traffic. A Core Network (CN) may include an AG, a network node for performing user registration of UEs, etc. The AG manages the mobility of UEs on a Tracking Area (TA) basis, a TA including a plurality of cells.

The developmental stage of wireless communication technology has reached LTE based on Wideband Code Division Multiple Access (WCDMA). Nonetheless, demands and expectation of users and service providers for advanced wireless communication services are still rising. Considering that the development of other competing wireless access technologies is in progress, a new advanced technology is needed to achieve future competitiveness. In addition, efforts should be expended toward reduction of cost per bit, increased service availability, flexible use of frequency bands, a simplified structure and open interface, and appropriate power consumption of UEs.

The 3GPP has recently been working on standardization of a successor to LTE. The successor to LTE will be referred to as "LTE-Advanced" or "LTE-A" herein. A major difference between the LTE system and the LTE-A system lies in that the latter supports uplink transmission in a multi-antenna technique.

SUMMARY OF THE INVENTION

Accordingly, the present invention is directed to a method and apparatus for transmitting an uplink reference signal in a multi-antenna wireless communication system that substantially obviates one or more problems due to limitations and disadvantages of the related art.

An object of the present invention is to provide a method and apparatus for transmitting an uplink RS in a multi-antenna wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting a Reference Signal (RS) during retransmission at a User Equipment (UE) in a multi-antenna wireless communication system includes receiving an uplink grant from a Base Station (BS), initially transmitting data and an RS corresponding to each layer based on the uplink grant, and receiving ACKnowledgment/Negative ACKnowledgment (ACK/NACK) information for the initially transmitted data and retransmitting the RS corresponding to each layer and the data according to the ACK/NACK information. The retransmission includes initializing a cyclic shift value for the RS corresponding to each layer according to a cyclic shift field for RSs included in the uplink grant.

The retransmission may include initializing an Orthogonal Cover Code (OCC) value for the RS corresponding to each layer according to the cyclic shift field for RSs included in the uplink grant.

In another aspect of the present invention, a UE apparatus in a multi-antenna wireless communication system includes a reception module for receiving an uplink grant from a BS, a processor for configuring an RS corresponding to each layer and data based on the uplink grant and configuring the RS and the data for retransmission based on ACK/NACK information for the data, and a transmission module for transmitting or retransmitting the RS and the data. The processor may initialize a cyclic shift value for the RS corresponding to each layer according to a cyclic shift field for RSs included in the uplink grant.

The processor may initialize an OCC value for the RS corresponding to each layer according to the cyclic shift field for RSs included in the uplink grant.

Cyclic shifts allocated to RSs corresponding to layers may have a maximum spacing. The cyclic shift values may range from 0 to 11 and a maximum spacing between the cyclic shift values may be 6.

The cyclic shift value of the RS corresponding to each layer may be defined by an initial cyclic shift value indicated by the cyclic shift field and an offset preset for each layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 illustrates a control-plane protocol stack and a user-plane protocol stack in a radio interface protocol architecture conforming to a $3^{rd}$ Generation Partnership Project (3GPP) wireless access network standard between a User Equipment (UE) and an Evolved UMTS Terrestrial Radio Access Network (E-UTRAN).

DETAILED DESCRIPTION OF THE INVENTION

Figure 1:
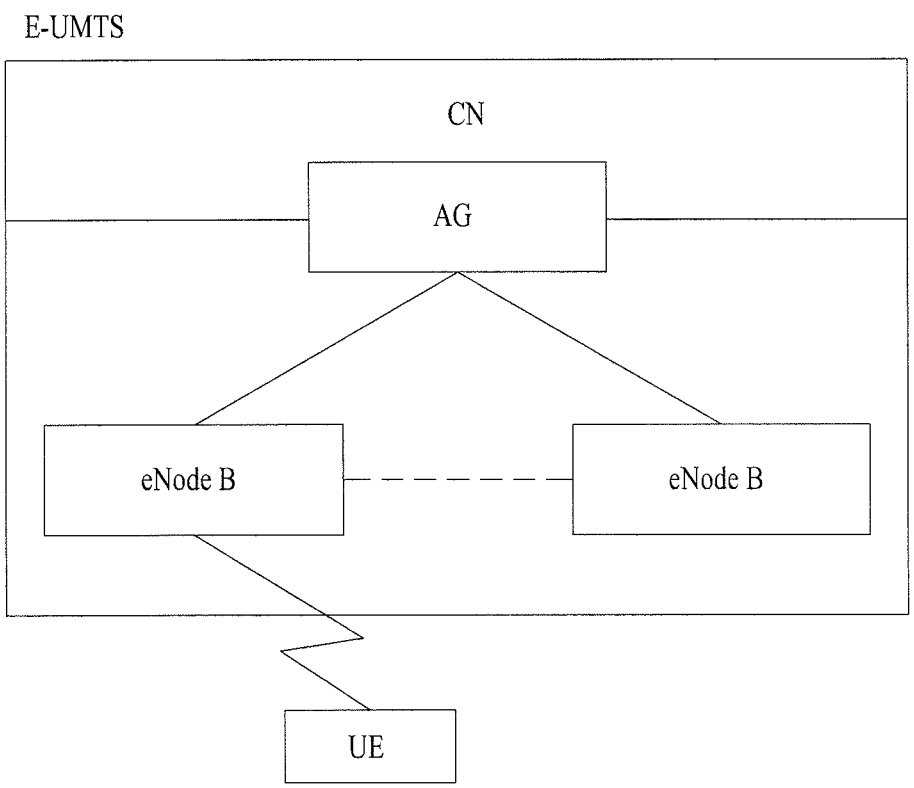
FIG. 1 illustrates the configuration of an Evolved Universal Telecommunications Systems (E-UMTS) network as an example of a mobile communication system.

The configuration, operation, and other features of the present invention will readily be understood with embodiments of the present invention described with reference to the attached drawings. Embodiments of the present invention as set forth herein are examples in which the technical features of the present invention are applied to a $3^{rd}$ Generation Partnership Project (3GPP) system.

Hereinbelow, a system using a single frequency block as a system band is referred to as a legacy system or narrowband system. In comparison, a system that has a plurality of frequency blocks as a system band and uses at least one of the frequency blocks as the system block of the legacy system is referred to as an evolved system or wideband system. The frequency block used as the legacy system block is equal in size to the system block of the legacy system. While the sizes of the other frequency blocks are not limited otherwise, they may be determined based on the size of the system block of the legacy system, in terms of system simplification. For example, the 3GPP LTE system and the 3GPP LTE-A system are in the relationship between a legacy system and an evolved system.

In this context, the 3GPP LTE system will be referred to as an LTE system or legacy system, and the 3GPP LTE-A system will be referred to as an LTE-A system or evolved system. Accordingly, a UE supporting the LTE system and a UE supporting the LTE-A system are referred to as an LTE UE or legacy UE and an LTE-A UE or evolved UE, respectively.

While embodiments of the present invention are described in the context of the LTE and LTE-A systems, they are purely exemplary. Therefore, the embodiments of the present invention are applicable to any other communication system as long as the above definitions are valid for the communication system. In addition, the following description is given with the appreciation that the embodiments of the present invention are implemented in Frequency Division Duplexing (FDD). Yet, the embodiments of the present invention are also applicable to Half-FDD (H-FDD) or Time Division Duplexing (TDD) with a slight modification.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Meanwhile, data is transmitted on physical channels between the PHY layers of a transmitter and a receiver. The physical channels use time and frequency as radio resources. Specifically, the physical channels are modulated in Orthogonal Frequency Division Multiple Access (OFDMA) for downlink and in Single Carrier Frequency Division Multiple Access (SC-FDMA) for uplink.

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets.

A Radio Resource Control (RRC) layer at the lowest part of Layer 3 (or L3) is defined only on the control plane. The RRC layer controls logical channels, transport channels, and physical channels in relation to configuration, reconfiguration, and release of Radio Bearers (RBs). An RB refers to a service provided at L2, for data transmission between the UE and the E-UTRAN. For this purpose, the RRC layers of the UE and the E-UTRAN exchange RRC messages with each other. If an RRC connection has been established between the RRC layers of the UE and the E-UTRAN, the UE is in RRC connected mode. Otherwise, the UE is in RRC idle mode. A Non-Access Stratum (NAS) layer above the RRC layer performs functions such as session management, mobility management, etc.

A cell covered by an eNB is set to one of the bandwidths of 1.25, 2.5, 5, 10, 15, and 20 MHz and provides downlink or uplink transmission service to a plurality of UEs in the bandwidth. Different cells may be set to different bandwidths.

Downlink transport channels used to deliver data from the E-UTRAN to UEs include a Broadcast CHannel (BCH) carrying system information, a Paging CHannel (PCH) carrying a paging message, and a Shared CHannel (SCH) carrying user traffic or a control message. Downlink multicast or broadcast traffic or control messages may be transmitted on a downlink SCH or a separately defined downlink Multicast CHannel (MCH). Uplink transport channels used to deliver data from a UE to the E-UTRAN include a Random Access CHannel (RACH) carrying an initial control message and an uplink SCH carrying user traffic or a control message. Logical channels that are defined above transport channels and mapped to transport channels include a Broadcast Control CHannel (BCCH), a Paging Control CHannel (PCCH), a Common Control CHannel (CCCH), a Multicast Control CHannel (MCCH), and a Multicast Traffic CHannel (MTCH).

Figure 3:
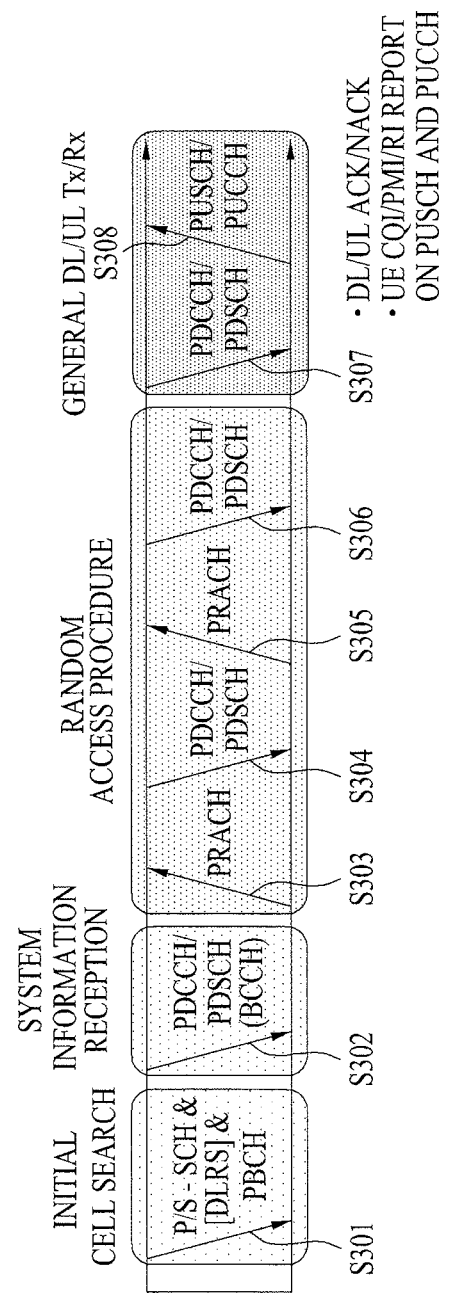
FIG. 3 illustrates physical channels and signal transmission on the physical channels in a 3GPP system.

FIG. 3 illustrates physical channels and a method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization CHannel (P-SCH) and a Secondary Synchronization CHannel (S-SCH) from the eNB. Then the UE may acquire information broadcast in the cell by receiving a Physical Broadcast CHannel (PBCH) from the eNB. During the initial cell search, the UE may monitor a downlink channel state by receiving a DownLink Reference Signal (DL RS).

After the initial cell search, the UE may acquire detailed system information by receiving a Physical Downlink Control CHannel (PDCCH) and receiving a Physical Downlink Shared CHannel (PDSCH) based on the PDCCH (S302).

If the UE initially accesses the eNB or has no radio resources for signal transmission, the UE may perform a random access procedure (S303 to S306). In the random access procedure, the UE may transmit a predetermined sequence as a preamble on a Physical Random Access CHannel (PRACH) (S303 and S305) and receive a response message to the preamble on a PDCCH and a PDSCH associated with the PDCCH (S304 and S306). In case of a contention-based random access procedure, the UE may additionally perform a contention resolution procedure.

After the above procedure, the UE may receive a PDCCH and/or a PDSCH from the eNB (S307) and transmit a Physical Uplink Shared CHannel (PUSCH) and/or a Physical Uplink Control CHannel (PUCCH) to the eNB (S308), which is a general downlink and uplink signal transmission procedure. Control information that the UE transmits to the eNB on the uplink or receives from the eNB on the downlink includes a downlink/uplink ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
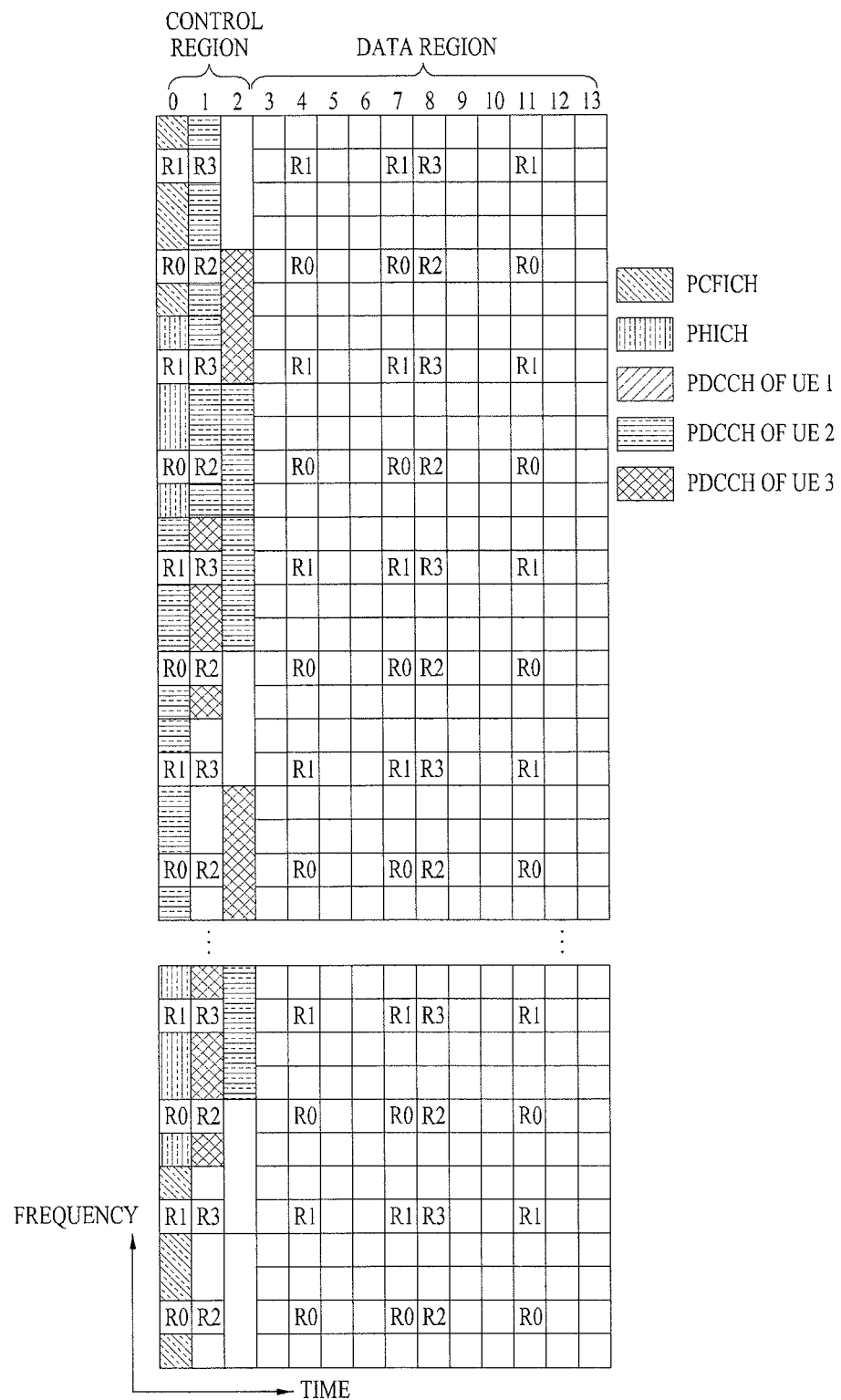
FIG. 4 illustrates a downlink subframe structure in a Long Term Evolution (LTE) system.

FIG. 4 illustrates exemplary control channels transmitted in a control region of a subframe in a downlink radio frame.

Referring to FIG. 4, a subframe includes 14 Orthogonal Frequency Division Multiplexing (OFDM) symbols. A control region occupies the first one to three OFDM symbols and a data region occupies the other OFDM symbols in the subframe according to the configuration of the subframe. In FIG. 4, reference characters R1 to R4 denote Reference Signals (RSs) for antenna 0 to antenna 3. RSs are transmitted in a predetermined pattern within a subframe irrespective of the control region and the data region of the subframe. Control channels are allocated to resources unused for RSs in the control region, and traffic channels are allocated to resources unused for RSs in the data region. The control channels of the control region are a Physical Control Format Indicator CHannel (PCFICH), a Physical Hybrid-ARQ Indicator CHannel (PHICH), a Physical Downlink Control CHannel (PDCCH), etc.

The PCFICH specifies the number of OFDM symbols used for PDCCHs in every subframe, for UEs. The PCFICH is located in the first OFDM symbol and configured with priority over the PHICH and the PDCCHs. The PCFICH includes four Resource Element Groups (REGs), each REG being distributed across the control region based on a cell Identity (ID). One REG has four REs. An RE is a minimum physical resource defined as one subcarrier by one OFDM symbol. A PCFICH value, which is modulated in Quadrature Phase Shift Keying (QPSK), ranges from 1 to 3 or from 2 to 4 according to bandwidths.

The PHICH carries an HARQ ACK/NACK for uplink transmission. That is, the PHICH is a channel used to deliver an HARQ ACK/NACK for uplink HARQ. The PHICH includes one REG and is scrambled cell-specifically. The ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. The same PHICH (group) occurs three times, for achieving a diversity gain in the frequency and/or time domain.

A PDCCH is allocated to the first n OFDM symbols of a subframe. n is 1 or a larger integer indicated by the PCFICH. The PDCCH includes one or more Control Channel Elements (CCEs). The PDCCH is used to inform a UE or a UE group of the resource allocation of transport channels, namely a PCH and a DownLink SCH (DL-SCH), an uplink scheduling grant, and HARQ information. The PCH and the DL-SCH are transmitted on a PDSCH. Therefore, the eNB and the UE transmit and receive data on a PDSCH except for particular control information or service data.

Information about the destination (one or more UEs) of data of a PDSCH and information about how the UEs should receive and decode the PDSCH data is delivered on a PDCCH. For example, if the Cyclic Redundancy Check (CRC) of a particular PDCCH is masked by Radio Network Temporary Identity (RNTI) "A" and information about data transmitted in radio resources "B" (e.g. a frequency position) with DCI format "C" being a transport format (e.g. a Transport Block (TB) size, a modulation scheme, coding information, etc.) is transmitted in a particular subframe, UEs within the cell of the eNB monitor the PDCCH using their RNTIs. If one or more UEs have RNTI "A", the UEs receive the PDCCH and receives a PDSCH indicated by "B" and "C" based on the received information of the PDCCH.

Figure 5:
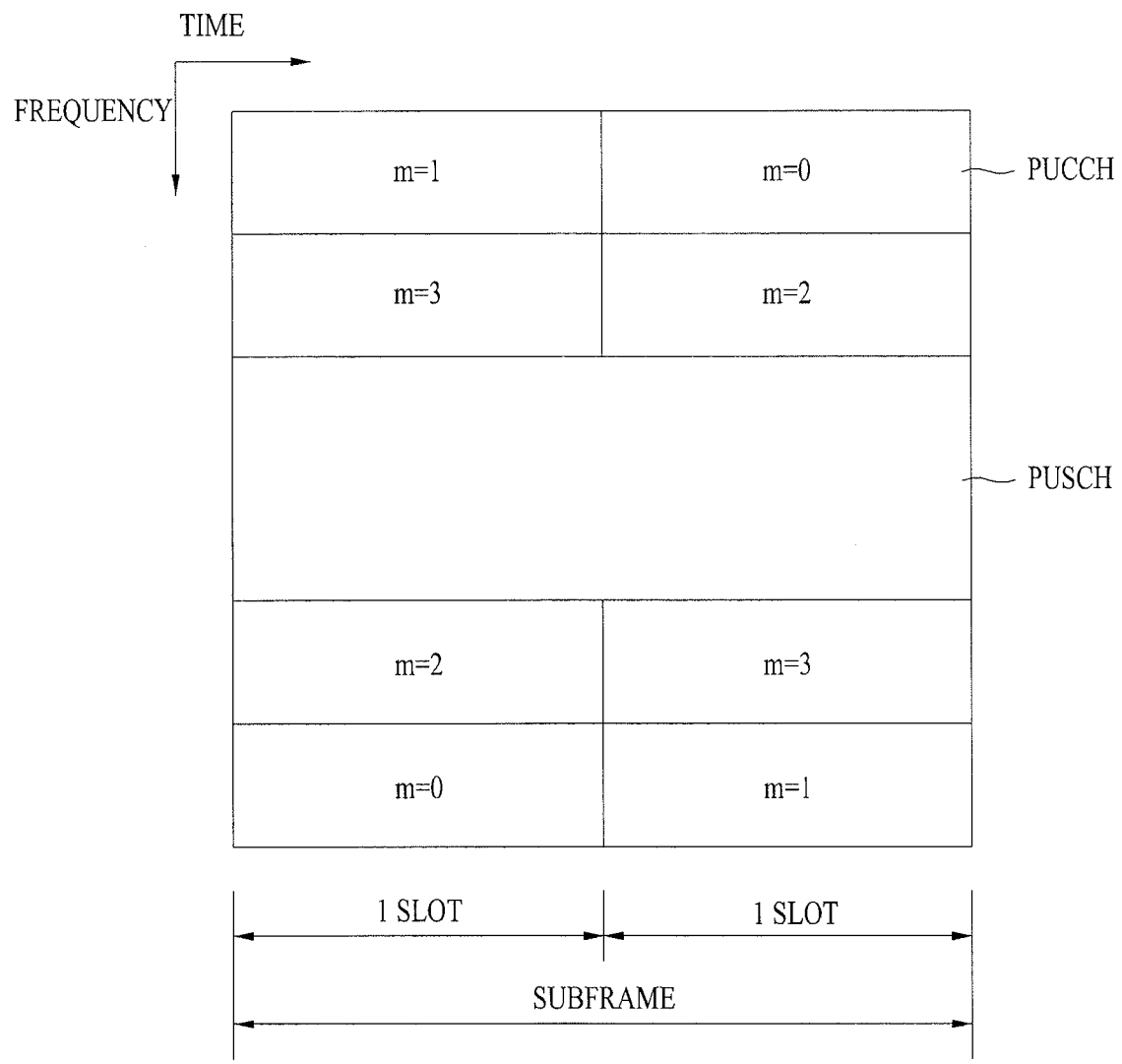
FIG. 5 is a view illustrating an uplink subframe structure in the LTE system.

FIG. 5 is a view illustrating an uplink subframe structure in the LTE system.

Referring to FIG. 5, an uplink subframe is divided into a plurality of slots (e.g. two slots). Each slot may include a different number of SC-FDMA symbols depending on a CP length. For example, a slot may include 7 SC-FDMA symbols in case of a normal CP. The uplink subframe is divided into a data region and a control region. The data region includes a PUSCH, for transmitting data such as voice data and the control region includes a PUCCH, for transmitting control information. The PUCCH has a pair of RBs m (e.g. m=0, 1, 2, 3) at both ends of the data region in the frequency domain, with frequency hopping between slots. The control information includes an ACK/NACK, a CQI, a PMI, an RI, etc.

Figure 6:
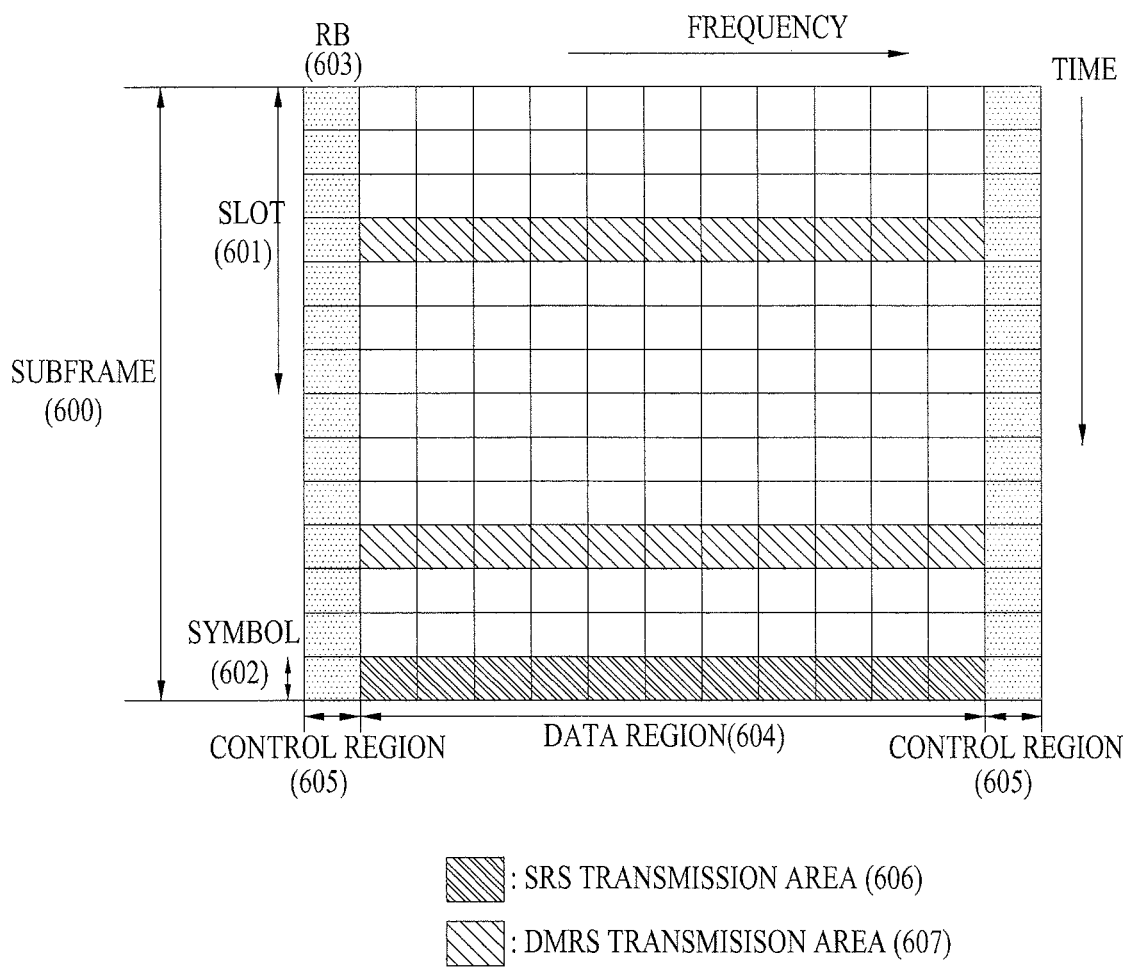
FIG. 6 is another view illustrating the uplink subframe structure in the LTE system.

FIG. 6 is another view illustrating the uplink subframe structure in the LTE system.

Referring to FIG. 6, a basic unit for LTE uplink transmission, a 1-ms subframe 600 includes two 0.5-ms slots 601. In case of a normal CP, each slot has 7 symbols 602, each symbol being an SC-FDMA symbol. An RB 603 is a resource allocation unit defined by 12 subcarriers in frequency by one slot in time. The LTE uplink subframe is largely divided into a data region 604 and a control region 605. The data region 604 refers to the remaining communication resources except for the control region, used to transmit data such as voice data and packets. The control region 605 refers to communication resources used for each UE to transmit a downlink channel quality report, an ACK/NACK for a received downlink signal, an uplink scheduling request, etc.

As illustrated in FIG. 6, a Sounding Reference Signal (SRS) area 606 resides in the last SC-FDMA symbol of a subframe in the time domain and in the data transmission band of the subframe in the frequency domain. SRSs transmitted from a plurality of UEs in the last SC-FDMA symbol of the same subframe can be identified by their frequency positions.

A DMRS area 607 is located in the middle SC-FMDA symbol of each slot in the subframe in the time domain and in the data transmission band of the subframe in the frequency domain. For example, DMRSs are transmitted in 4$^{th}$ and 11$^{th}$ SC-FDMA symbols of a subframe with a normal CP.

DMRSs may be transmitted in combination with a PUSCH or a PUCCH. An SRS is a reference signal that a UE transmits to an eNB, for uplink scheduling. The eNB estimates an uplink channel using the received SRS and performs uplink scheduling based on the uplink channel estimate. The SRS is not combined with a PUSCH or a PUCCH, for transmission. The same type of base sequence may be used for both a DMRS and an SRS. For uplink multi-antenna transmission, the same precoding as used for a PUSCH may be applied to a DMRS.

Figure 7:
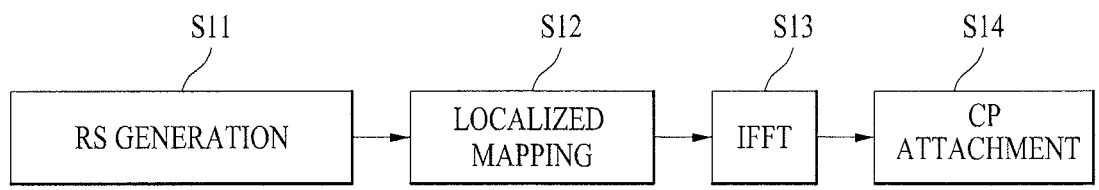
FIG. 7 illustrates a signal processing method for transmitting a DeModulation Reference Signal (DMRS).

FIG. 7 illustrates a signal processing operation for transmitting a DMRS.

Referring to FIG. 7, while a time signal is generated for data, mapped to a frequency by a Discrete Fourier Transform (DFT) precoder, and then transmitted after Inverse Fast Fourier Transform (IFFT) processing, an RS is generated in the frequency domain (S11) without being processed in the DFT precoder, is subjected sequentially to localized mapping (s12), IFFT processing (S13), and CP attachment (S14), and then transmitted.

Figure 8:
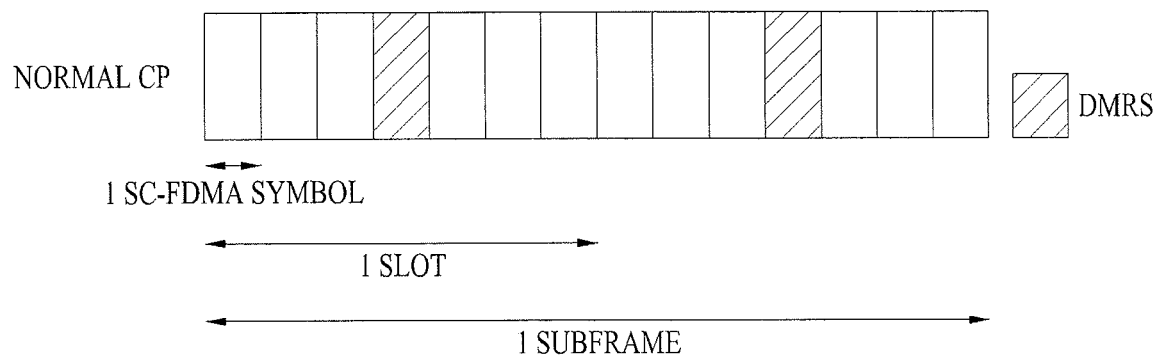
FIG. 8 illustrates a subframe structure designed to transmit DMRSs in case of a normal Cyclic Prefix (CP).
Figure 9:
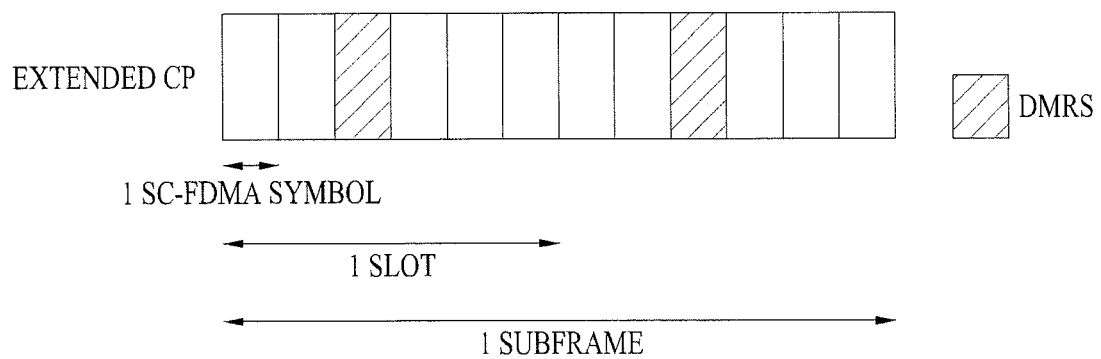
FIG. 9 illustrates a subframe structure designed to transmit DMRSs in case of an extended CP.

FIG. 8 illustrates a subframe structure designed to transmit DMRSs in case of a normal CP and FIG. 9 illustrates a subframe structure designed to transmit DMRSs in case of an extended CP.

Now a description will be given of a Multiple Input Multiple Output (MIMO) system. Beyond conventional schemes using a single Transmission (Tx) antenna and a single Reception (Rx) antenna, MIMO uses a plurality of Tx antennas and a plurality of Rx antennas to thereby increase the transmission and reception efficiency of data. With the use of multiple antennas at a transmitter or a receiver, MIMO seeks to increase capacity and improve performance in a wireless communication system. The term "MIMO" is interchangeable with "multi-antenna".

The MIMO technology does not depend on a single antenna path to receive a whole message. Rather, it completes the message by combining data fragments received through a plurality of antennas. Because MIMO can increase data rate within a certain area or extend system coverage at a given data rate, it is considered as a promising future-generation mobile communication technology that may find its use in a wide range including mobile terminals, relays, etc. MIMO can overcome a limited transmission capacity encountered with the conventional single-antenna technology.

Figure 10:
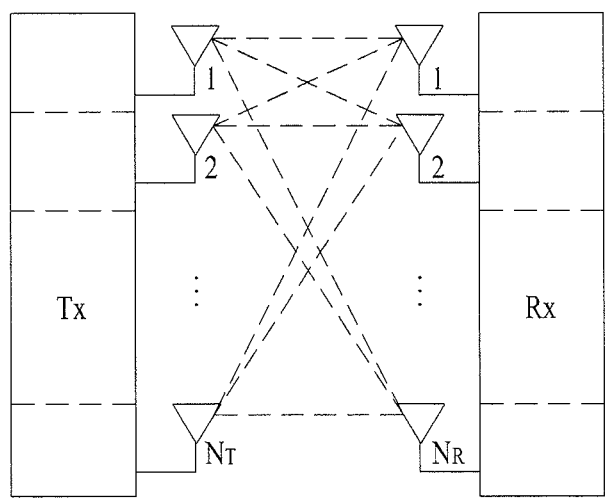
FIG. 10 illustrates the configuration of a multi-antenna communication system to which the present invention is applied.

FIG. 10 illustrates the configuration of a MIMO communication system. Referring to FIG. 10, a transmitter has $N_T$ Tx antennas and a receiver has $N_R$ Rx antennas. The simultaneous use of a plurality of antennas at both the transmitter and the receiver increases a theoretical channel transmission capacity, compared to use of a plurality of antennas at only one of the transmitter and the receiver. The channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in case of multiple antennas. $R_i$ is the smaller value between $N_T$ and $N_R$.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was proved in the middle 1990's, many techniques have been actively studied to increase data rate in real implementation. Some of the techniques have already been reflected in various wireless communication standards for 3G mobile communications, future-generation Wireless Local Area Network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with $N_T$ Tx antennas and $N_R$ Rx antennas as illustrated in FIG. 10 will be described in detail through mathematical modeling.

Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector x, which may be determined by $$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$
$$= WPs$$

[Equation 5]

where $w_{ij}$ denotes a weight between a $j^{th}$ piece of information and an $i^{th}$ Tx antenna.

In general, the rank of a channel matrix is the maximum number of different pieces of information that can be transmitted on a physical channel, in its physical meaning. Therefore, the rank of a channel matrix is defined as the smaller between the number of independent rows and the number of independent columns in the channel matrix. The rank of the channel matrix is not larger than the number of rows or columns of the channel matrix. The rank of a channel matrix H, rank(H) satisfies the following constraint.

$$\text{rank}(H) \leq \min(N_T, N_R) \quad \text{[Equation 6]}$$

A different piece of information transmitted in MIMO is referred to as 'transmission stream' or shortly 'stream'. The 'stream' may also be called 'layer'. It is thus concluded that the number of transmission streams is not larger than the rank of channels, i.e. the maximum number of different pieces of transmittable information.

Thus, the channel matrix H is determined by $$\text{\# of streams} \leq \text{rank}(H) \leq \min(N_T, N_R) \quad \text{[Equation 7]}$$

where "# of streams" denotes the number of streams. One thing to be noted herein is that one stream may be transmitted through one or more antennas.

One or more streams may be mapped to a plurality of antennas in many ways. The stream-to-antenna mapping may be described as follows depending on MIMO schemes. If one stream is transmitted through a plurality of antennas, this may be regarded as spatial diversity. When a plurality of streams are transmitted through a plurality of antennas, this may be spatial multiplexing. Needless to say, a hybrid scheme of spatial diversity and spatial multiplexing in combination may be contemplated.

Figure 11:
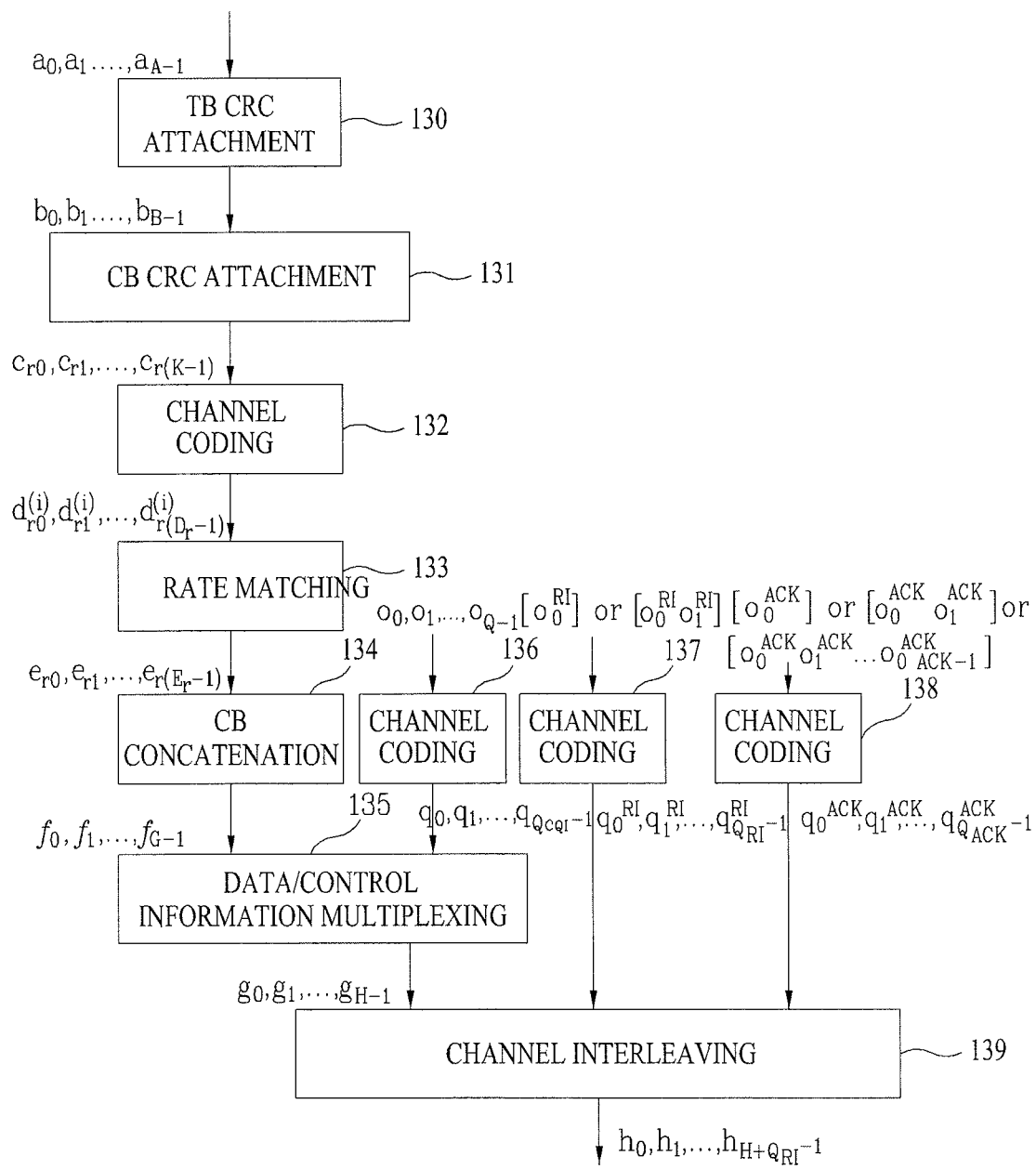
FIG. 11 is a block diagram illustrating an operation for processing an uplink shared channel being a transport channel.

A description will be given of an operation for processing an UpLink SCH (UL-SCH) as a transport channel. FIG. 11 is a block diagram illustrating a transport channel processing operation for a UL-SCH.

Referring to FIG. 11, a Transport Block (TB) of data information to be multiplexed with control information is attached with a TB CRC (130). The TB with the TB CRC is divided into a plurality of Code Blocks (CBs) according to the size of the TB and each of the CBs is attached with a CB CRC (131). The CBs with the CB CRCs are channel-encoded (132). After the channel-encoded data is rate-matched (133), the rate-matched CBs are concatenated (134) and multiplexed with a CQI/PMI (135).

The CQI/PMI is channel-encoded separately from the data (136) and then multiplexed with the data (135). In addition, an RI is also channel-encoded separately from the data (137).

An ACK/NACK is channel-encoded separately from the data, the CQI/PMI, and the RI (138). The multiplexed data and CQI/PMI, the separately channel-encoded RI, and the separately channel-encoded ACK/NACK are channel-interleaved, thereby producing an output signal (139).

Now, REs for data and control channels in the LTE uplink system will be described below.

Figure 12:
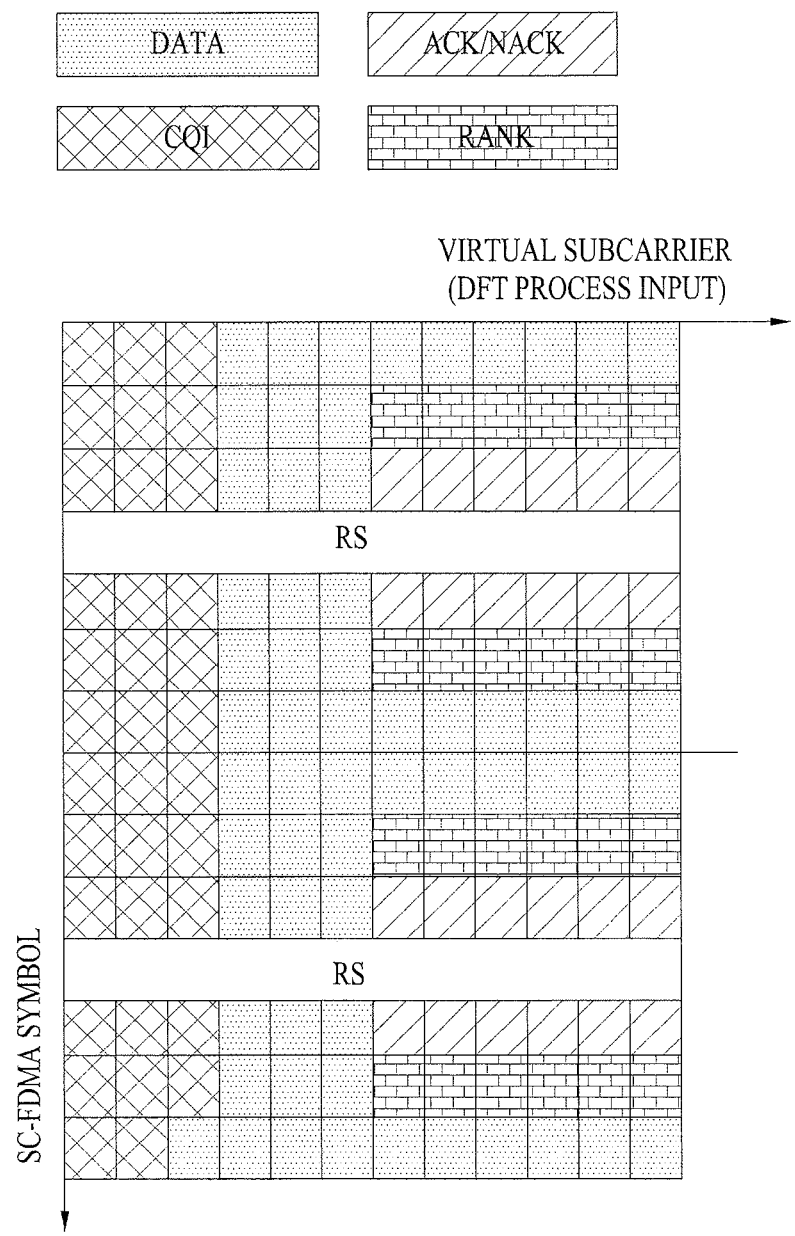
FIG. 12 illustrates a method for mapping uplink data and control channels to physical resources.

FIG. 12 illustrates a method for mapping uplink data and control channels to physical resources.

Referring to FIG. 12, a CQI/PMI and data are mapped to REs in a time-first manner. An encoded ACK/NACK is inserted around DMRS symbols through puncturing. An RI is mapped to REs next to the REs of the ACK/NACK. Up to four SC-FDMA symbols may be used for each of the RI and the ACK/NACK. When data and control information are simultaneously transmitted on a UL-SCH, an RI, a concatenation of a CQI/PMI and data, and an ACK/NACK are sequentially mapped in this order. Specifically, the RI is mapped to REs first of all and then the concatenated CQI/PMI and data is mapped to the remaining REs in the time-first manner. The ACK/NACK is mapped by puncturing the already-mapped concatenated CQI/PMI and data.

The single-carrier property can be satisfied by multiplexing data with Uplink Control Information (UCI) such as a CQI/PMI. Therefore, uplink transmission with a low Cubic Metric (CM) can be performed. A system (e.g. the LTE-A system) evolved from a legacy system may employ at least one of SC-FDMA and clustered DFT spread OFDMA (DFTs OFDMA) for uplink transmission on each component carrier for a UE and that along with UL-MIMO.

Figure 13:
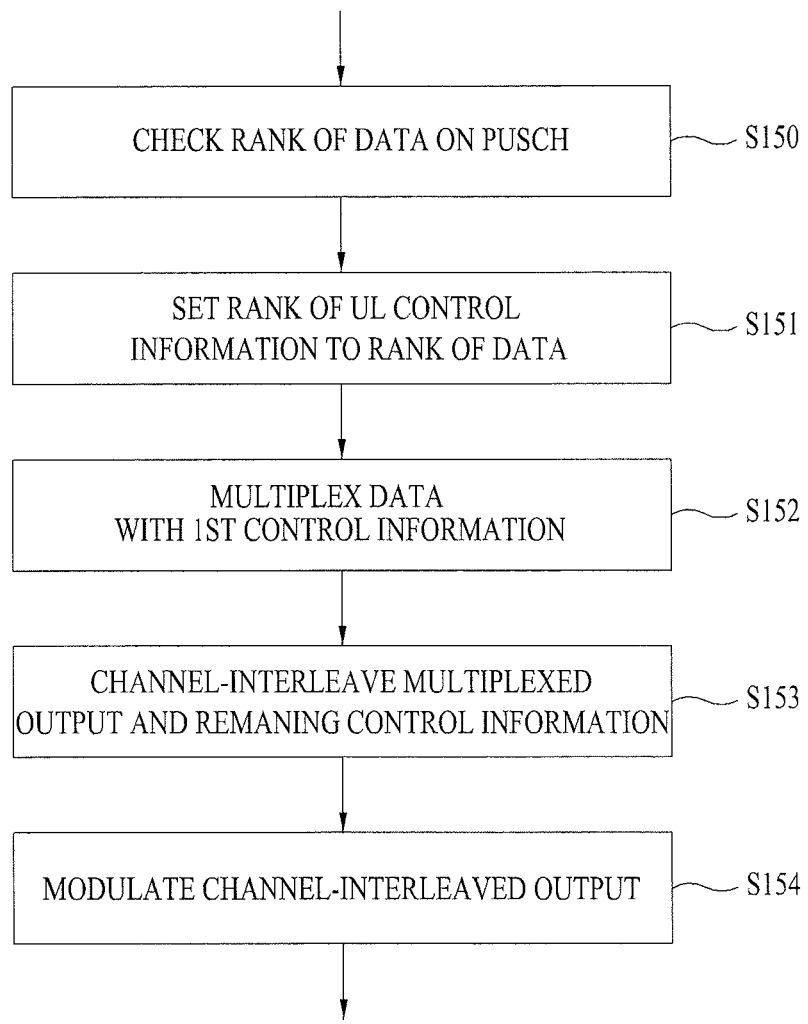
FIG. 13 is a flowchart illustrating a method for efficiently multiplexing data and control channels into an uplink shared channel.

FIG. 13 is a flowchart illustrating a method for efficiently multiplexing data and control channels over a UL-SCH.

Referring to FIG. 13, a UE checks the rank of data of a PUSCH (S150) and sets the same rank as that of the data for uplink control channels (S151). The uplink control channels refer to UCI such as a CQI, ACK/NACK, and RI. The UE multiplexes the data with first control information (S152). Then, the UE may perform channel interleaving on the multiplexed output and the control information other than the first control information in order to help mapping of the data and a CQI in a time-first manner, mapping of an RI to predetermined REs, and mapping of an ACK/NACK through puncturing of REs next to DMRSs (S153). The data and the control channels may be modulated in QPSK, 16-ary Quadrature Amplitude Modulation (16QAM), 64-ary QAM (64QAM), or the like according to a Modulation and Coding Scheme (MCS) table (S154). The modulation may be performed in a different order. For instance, the modulation step may precede the step of multiplexing data and the first control information. The channel interleaving may be carried out on a codeword basis or on a layer basis.

Figure 14:
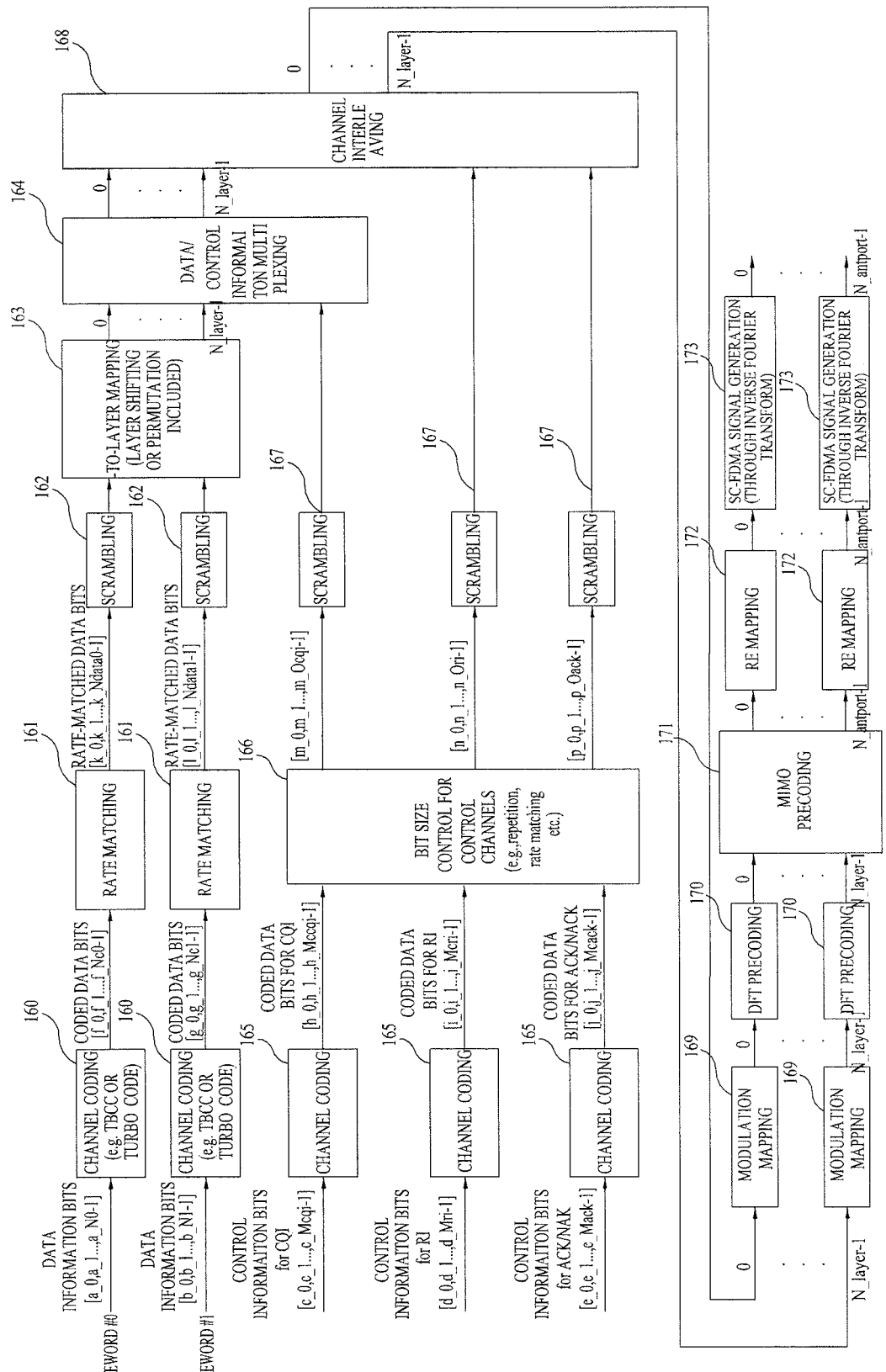
FIG. 14 is a block diagram illustrating a method for generating a transmission signal carrying data and control channels.

FIG. 14 is a block diagram illustrating a method for generating a transmission signal carrying data and control channels. The position of each function block may vary depending on an application scheme. Given two codewords, each codeword is channel-encoded separately (160) and the coded data bits are rate-matched according to a given MCS level and the size of allocated resources (161). The rate-matched data bits may be scrambled in a cell-specific, UE-specific, or codeword-specific fashion (162). Then the scrambled data is subjected to codeword-to-layer mapping (163). The codeword-to-layer mapping may involve layer shifting or permutation.

Figure 15:
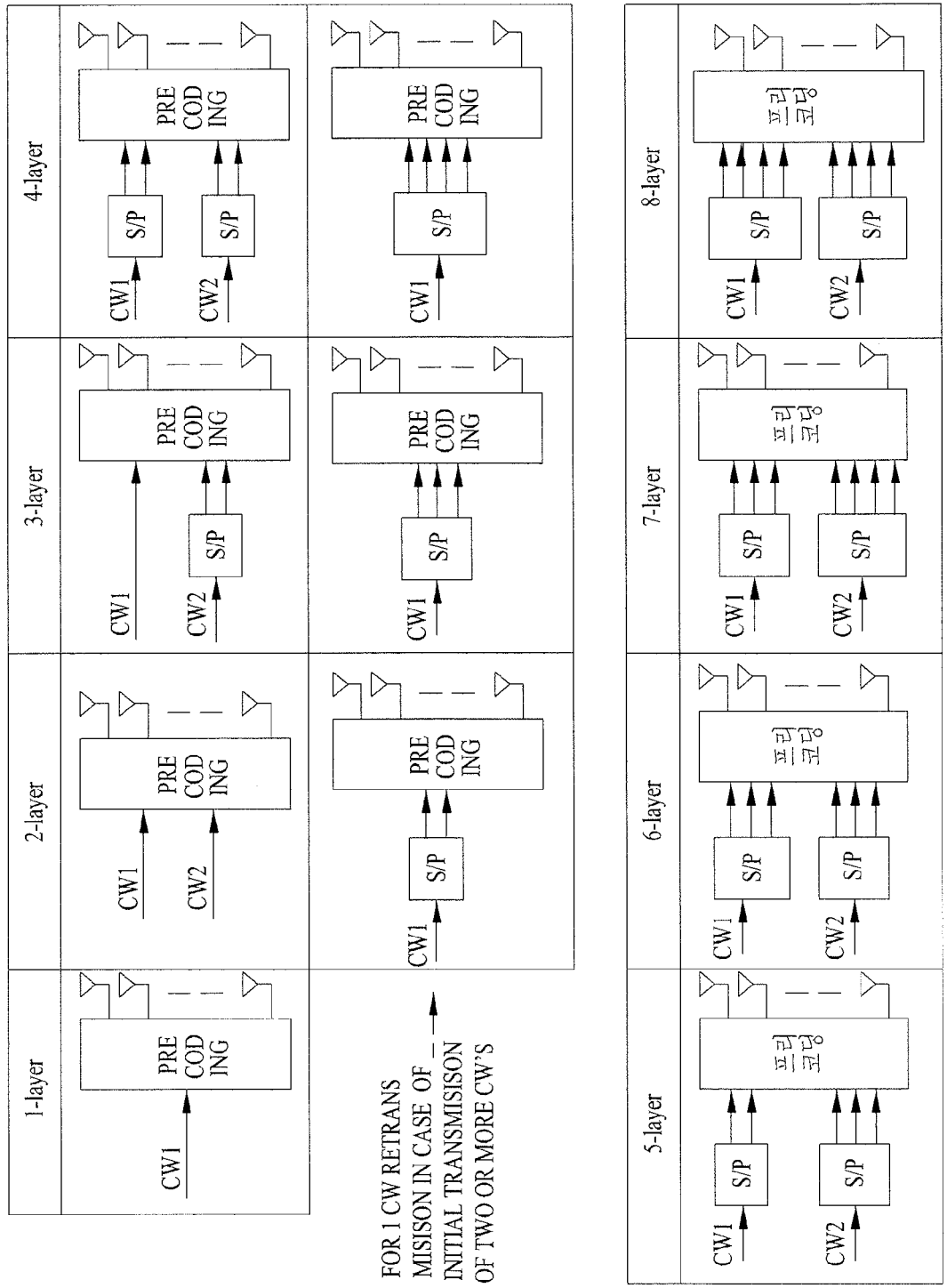
FIG. 15 illustrates codeword-to-layer mapping methods.

FIG. 15 illustrates codeword-to-layer mapping methods. Codewords may be mapped to layers in the rule illustrated in FIG. 15.

Referring to FIG. 14 again, control information such as a CQI, an RI, and an ACK/NACK is channel-encoded according to a given specification (165). The CQI, RI, and ACK/NACK may be encoded using the same channel code for all codewords or different channel codes for different codewords.

The bit number of the encoded control bits may be changed by a bit size controller (166). The bit size controller may be incorporated into channel encoders. The bit size-controlled control information is scrambled (167). The scrambling may be cell-specific, layer-specific, codeword-specific, or UE-specific.

The bit size controller may operate as follows.

(1) The bit size controller checks the rank of data of a PUSCH, n_rank_pusch.

(2) The rank of a control channel, n_rank_control is set to the rank of the data, n_rank_pusch (i.e. n_rank_control=n_rank_pusch), and the bit number of the control channel, n_bit_ctrl is increased by multiplying the bit number of the control channel, n_bit_ctrl by the rank of the control channel.

One of bit size control methods is to simply copy the control channel and repeat the copy. This control channel may be at an information level before channel coding or at a coded bit level after channel coding. For example, if a control channel with n_bit_ctrl=4 is given as [a0, a1, a2, a3] and n_rank_pusch=2, the control channel may be extended to [a0, a1, a2, a3, a0, a1, a2, a3] and thus n_ext_ctrl=8.

When the bit size controller and the channel encoders are incorporated, coded bits may be generated through channel coding and rate matching as defined in the legacy system (e.g. LTE Rel-8).

For further randomization for each layer in addition to the bit size control, bit-level interleaving may be performed. Or equivalent modulation symbol-level interleaving may be performed.

A CQI/PMI channel and the data of two codewords may be multiplexed at a data/control multiplexer (164). Then, a channel interleaver maps the CQI/PMI to REs in a time-first manner, while mapping the ACK/NACK information to REs next to DMRSs in both slots of a subframe (168).

Each layer is modulated (169) and is subjected sequentially to DFT precoding (170), MIMO precoding (171), and RF mapping (172). As a result, an SC-FDMA signal is generated and transmitted through antennas (173).

The function blocks are not limited to the positions specified in FIG. 14. When needed, their positions may be changed. For example, the scramblers may reside after the channel interleaver. In addition, the codeword-to-layer mapper may be located after the channel interleaver or the modulation mapper.

Now a detailed description will be given of DMRSs.

An RS sequence $r_{u,v}^{(\alpha)}(n)$ may be defined by a base sequence $\bar{r}_{u,v}(n)$ and its cyclic shift $\alpha$ according to $$r_{u,v}^{(\alpha)}(n) = e^{j\alpha n}\bar{r}_{u,v}(n), 0 \leq n < M_{sc}^{RS} \quad \text{[Equation 8]}$$

where $M_{sc}^{RS}$ is the length of the RS sequence with $1 \leq m \leq N_{RB}^{max,UL}$ and $M_{sc}^{RS} = mN_{sc}^{RB}$ ( ). $N_{sc}^{RB}$ is the size of an RB expressed as the number of subcarriers in the frequency domain, and $N_{RB}^{max,UL}$ is a maximum uplink bandwidth expressed as a multiple of $N_{sc}^{RB}$. A plurality of RS sequences may be defined from a single base sequence by using different values of the cyclic shift $\alpha$.

Base sequences $\bar{r}_{u,v}(n)$ are divided into a plurality of groups, where $u \in \{0, 1, \ldots, 29\}$ is a group index and v is a base sequence index within the group. The definition of the base sequence depends on the base sequence length $M_{sc}^{RS}$. For sequence lengths up to five RBs, that is, $M_{sc}^{RS} = mN_{sc}^{RB}$, $1 \leq m \leq 5$, each sequence group contains a single base sequence (v=0). For sequence lengths greater than five RBs, that is, $M_{sc}^{RS} = mN_{sc}^{RB}$, $6 \leq m \leq n_{RB}^{max,UL}$, each sequence group contains two base sequences (v=0, 1). The sequence group index u and the base sequence index v within the group may be changed in time, as in later-described group hopping or sequence hopping.

A base sequences of length $3N_{sc}^{RB}$ or larger is given by $$\bar{r}_{u,v}(n) = x_q(n \bmod N_{ZC}^{RS}), 0 \leq n < M_{sc}^{RS} \quad \text{[Equation 9]}$$

where q is the root index of a Zadoff-Chu (ZC) sequence, $N_{ZC}^{RS}$ is the length of the ZC sequence which is the largest prime number smaller than $M_{sc}^{RS}$. The $q^{th}$ root ZC sequence is defined by $$x_q(m) = e^{-j\frac{\pi qm(m+1)}{N_{ZC}^{RS}}}, 0 \leq m \leq N_{ZC}^{RS} - 1 \quad \text{[Equation 10]}$$

with q given by $$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31 \quad \text{[Equation 11]}$$

A base sequence with a length less than $3N_{sc}^{RB}$ may be given by $$\bar{r}_{u,v}(n) = e^{j\phi(n)\pi/4}, 0 \leq n \leq M_{sc}^{RS} - 1 \quad \text{[Equation 12]}$$

where the value of $\phi(n)$ is given in Table 1 and Table 2 for $M_{sc}^{RS} = N_{sc}^{RB}$ and $M_{sc}^{RS} = 2N_{sc}^{RB}$, respectively.

TABLE 1

| $\phi(0), \ldots, \phi(11)$ | | | | | | | | | | | |
|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |

TABLE 1-continued

| | | | | | $\phi(0), \ldots, \phi(11)$ | | | | | | | |
|---|---|---|---|---|---|---|---|---|---|---|---|---|
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

There may exist 17 different hopping patterns and 30 different sequence shift patterns. Sequence group hopping may be enabled or disabled by higher layers.

A PUCCH and a PUSCH may have the same hopping pattern. The group hopping pattern $f_{gh}(n_s)$ may be defined by $$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases} \quad \text{[Equation 14]}$$

where c(i) is a pseudo-random sequence being a Pseudo-Noise (PN) sequence, which may be defined by a Gold sequence of length 31. [Equation 15] describes an exemplary Gold sequence c(n).

$$c(n) = (x_1(n+N_c) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_1(n+1) + x_1(n)) \bmod 2 \quad \text{[Equation 15]}$$

where $N_c$ is 1600, $x_1(i)$ is a first m-sequence, and $x_2(i)$ is a second m-sequence. For example, the first or second m-sequence may be initialized according to a cell ID, a slot number in a radio frame, an SC-FDMA symbol index in the slot, a CP type, etc. in each SC-FDMA symbol. A pseudo-random sequence generator may be initialized with

TABLE 2

| | | | | | | | | | | $\phi(0), \ldots, \phi(23)$ | | | | | | | | | | | | | | |
|---|---|---|---|---|---|---|---|---|---|---|---|---|---|---|---|---|---|---|---|---|---|---|---|---|
| 0 | -1 | 3 | 1 | -3 | 3 | -1 | 1 | 3 | -3 | 3 | 1 | 3 | -3 | 3 | 1 | 1 | -1 | 1 | 3 | -3 | 3 | -3 | -1 | -3 |
| 1 | -3 | 3 | -3 | -3 | -3 | 1 | -3 | -3 | 3 | -1 | 1 | 1 | 1 | 3 | 1 | -1 | 3 | -3 | -3 | 1 | 3 | 1 | 1 | -3 |
| 2 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |
| 3 | -1 | -3 | 1 | 1 | 3 | -3 | 1 | 1 | -3 | -1 | -1 | 1 | 3 | 1 | 3 | 1 | -1 | 3 | 1 | 1 | -3 | -1 | -3 | -1 |
| 4 | -1 | -1 | -1 | -3 | -3 | -1 | 1 | 1 | 3 | 3 | -1 | 3 | -1 | 1 | -3 | 1 | -1 | -3 | -3 | 1 | -3 | -1 | -1 |
| 5 | -3 | 1 | 1 | 3 | -1 | 1 | 3 | 1 | -3 | 1 | -3 | 1 | 1 | -1 | -1 | 3 | -1 | -3 | 3 | -3 | -3 | -3 | 1 | 1 |
| 6 | 1 | 1 | -1 | -1 | 3 | -3 | -3 | 3 | -3 | 1 | -1 | -1 | 1 | -1 | 1 | 1 | -1 | -3 | -1 | 1 | -1 | 3 | -1 | -3 |
| 7 | -3 | 3 | 3 | -1 | -1 | -3 | -1 | 3 | 1 | 3 | 1 | 3 | 1 | 1 | -1 | 3 | 1 | -1 | 1 | 3 | -3 | -1 | -1 | 1 |
| 8 | -3 | 1 | 3 | -3 | 1 | -1 | -3 | 3 | -3 | 3 | -1 | -1 | -1 | -1 | 1 | -3 | -3 | -3 | 1 | -3 | -3 | -3 | 1 | -3 |
| 9 | 1 | 1 | -3 | 3 | 3 | -1 | -3 | -1 | 3 | -3 | 3 | 3 | 3 | -1 | 1 | 1 | -3 | 1 | -1 | 1 | 1 | -3 | 1 | 1 |
| 10 | -1 | 1 | -3 | -3 | 3 | -1 | 3 | -1 | -1 | -3 | -3 | -3 | -1 | -3 | -1 | 1 | 3 | -3 | 1 | -1 | 3 |
| 11 | 1 | 3 | 3 | -3 | -3 | 1 | 3 | 1 | -1 | -3 | -3 | -3 | 3 | 3 | -3 | 3 | 3 | -1 | -3 | 3 | -1 | 1 | -3 | 1 |
| 12 | 1 | 3 | 3 | 1 | 1 | 1 | -1 | -1 | 1 | -3 | 3 | -1 | 1 | 1 | -3 | 3 | 3 | -1 | -3 | 3 | -3 | -1 | -3 | -1 |
| 13 | 3 | -1 | -1 | -1 | -1 | -3 | -1 | 3 | 3 | 1 | -1 | 1 | 3 | 3 | 3 | -1 | 1 | 1 | -3 | 1 | 3 | -1 | -3 | 3 |
| 14 | -3 | -3 | 3 | 1 | 3 | 1 | -3 | 3 | 1 | 3 | 1 | 1 | 3 | 3 | -1 | -1 | -3 | 1 | -3 | -1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |
| 16 | -1 | -3 | 3 | -1 | -1 | -1 | -1 | 1 | 1 | -3 | 3 | 1 | 3 | 3 | 1 | -1 | 1 | -3 | 1 | -3 | 1 | 1 | -3 | -1 |
| 17 | 1 | 3 | -1 | 3 | 3 | -1 | -3 | 1 | -1 | -3 | 3 | 3 | 3 | -1 | 1 | 1 | 3 | -1 | -3 | -1 | 3 | -1 | -1 | -1 |
| 18 | 1 | 1 | 1 | 1 | 1 | -1 | 3 | -1 | -3 | 1 | 1 | 3 | -3 | 1 | -3 | -1 | 1 | 1 | -3 | -3 | 3 | 1 | 1 | -3 |
| 19 | 1 | 3 | 3 | 1 | -1 | -3 | 3 | -1 | 3 | 3 | 3 | -3 | 1 | -1 | 1 | -1 | -3 | -1 | 1 | 3 | -1 | 3 | -3 | -3 |
| 20 | -1 | -3 | 3 | -3 | -3 | -3 | -1 | -1 | -3 | -1 | -3 | 3 | 1 | 3 | -3 | -1 | 3 | -1 | 1 | -1 | 3 | -3 | 1 | -1 |
| 21 | -3 | -3 | 1 | 1 | -1 | 1 | -1 | 1 | -1 | 3 | 1 | -3 | -1 | 1 | -1 | 1 | -1 | -1 | 3 | 3 | -3 | -1 | 1 | -3 |
| 22 | -3 | -1 | -3 | 3 | 1 | -1 | -3 | -1 | -3 | -3 | 3 | -3 | 3 | -3 | -1 | 1 | 3 | 1 | -3 | 1 | 3 | 3 | -1 | -3 |
| 23 | -1 | -1 | -1 | -1 | 3 | 3 | 3 | 1 | 3 | 3 | -3 | 1 | 3 | -1 | 3 | -1 | 3 | 3 | -3 | 3 | 1 | -1 | 3 | 3 |
| 24 | 1 | -1 | 3 | 3 | -1 | -3 | 3 | -3 | -1 | -1 | 3 | -1 | 3 | -1 | -1 | 1 | 1 | 1 | 1 | -1 | -1 | -3 | -1 | 3 |
| 25 | 1 | -1 | 1 | -1 | 3 | -1 | 3 | 1 | 1 | -1 | -1 | -3 | 1 | 1 | -3 | 1 | 3 | -3 | 1 | 1 | -3 | -3 | -1 | -1 |
| 26 | -3 | -1 | 1 | 3 | 1 | 1 | -3 | -1 | -1 | -3 | 3 | -3 | 3 | 1 | -3 | 3 | -3 | 1 | -1 | 1 | -3 | 1 | 1 | 1 |
| 27 | -1 | 3 | 3 | 3 | 1 | 1 | 3 | -1 | -3 | -1 | -1 | 3 | 1 | -3 | -3 | -1 | 3 | -3 | -1 | -3 | -1 | -3 | -1 | -1 |
| 28 | -1 | -3 | -1 | -1 | 1 | -3 | -1 | -1 | 1 | -1 | -3 | 1 | 1 | -3 | 1 | -3 | -3 | 3 | 1 | 1 | -1 | 3 | -1 | -1 |
| 29 | 1 | 1 | -1 | -1 | -3 | -1 | 3 | -1 | 3 | -1 | 1 | 3 | 1 | -1 | 3 | 1 | 3 | -3 | -3 | 1 | -1 | -1 | 1 | 3 |

Sequence group hopping may be enabled for RSs in the following manner.

A sequence group index u in slot $n_s$ may be defined by a group hopping pattern $F_{gh}(n_s)$ and a sequence shift pattern $f_{ss}$ according to $$u = (f_{gh}(n_s) + f_{ss}) \bmod 30 \quad \text{[Equation 13]}$$

$$c_{init} = \left\lfloor \frac{N_{ID}^{cell}}{30} \right\rfloor$$

at the beginning of each radio frame.

The definition of a sequence shift pattern $f_{ss}$ may differ between the PUCCH and the PUSCH. For the PUCCH, the sequence shift pattern $f_{ss}^{PUCCH}$ may be given by $f_{ss}^{PUCCH} = N_{ID}^{cell} \mod 30$. For the PUSCH, the sequence shift pattern $f_{ss}^{PUSCH}$ may be given by $f_{ss}^{PUSCH} = (f_{ss}^{PUCCH} + \Delta_{ss}) \mod 30$ where $\Delta_{ss} \in \{0, 1, \ldots 29\}$ may be configured by higher layers.

Sequence hopping can be applied only to RSs of a length larger than $6N_{sc}^{RB}$. For RSs of a length equal to or lager than $6N_{sc}^{RB}$, the base sequence index v within the base sequence group in slot $n_s$ may be given by $$v = \begin{cases} c(n_s) & \text{if group hopping is disabled and sequence hopping is enabled} \\ 0 & \text{otherwise} \end{cases} \quad [\text{Equation 16}]$$

where c(i) may be described as [Equation 15] and higher layers determine if sequence hopping is enabled or disabled. The pseudo-random sequence generator may be initialized with $$c_{init} = \left\lfloor \frac{N_{ID}^{cell}}{30} \right\rfloor \cdot 2^5 + f_{ss}^{PUSCH}$$

at the beginning of each radio frame.

A DMRS sequence for the PUSCH may be defined by $$r^{PUSCH}(m \cdot M_{sc}^{RS} + n) = r_{u,v}^{(\alpha)}(n) \quad [\text{Equation 17}]$$

where $m=0, 1, n=0, \ldots M_{sc}^{RS}-1$ and $=M_{sc}^{RS}=M_{sc}^{PUSCH}$.

The cyclic shift $\alpha$ in a slot is given as $$\alpha = 2\pi \frac{n_{cs}}{12} \quad [\text{Equation 18}]$$

With $$n_{cs} = (n_{DMRS}^{(1)} + n_{DMRS}^{(2)} + n_{PRS}(n_s)) \mod 12 \quad [\text{Equation 19}]$$

where $n_{DMRS}^{(1)}$ is given according to a parameter cyclicShift provided by higher layers. Table 3 illustrates exemplary mapping of the parameter cyclicShift to $n_{DMRS}^{(1)}$ values.

TABLE 3

| Parameter | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

In [Equation 19], $n_{DMRS}^{(2)}$ may be defined by a cyclic shift field in DCI format 0 for a TB associated with a PUSCH transmission. The DCI format is indicated by a PDCCH and the cyclic shift field may be 3 bits long.

Table 4 illustrates exemplary mapping of the cyclic shift field in DCI format 0 to $n_{DMRS}^{(2)}$ values.

TABLE 4

| Cyclic shift field in DCI format 0 | $n_{DMRS}^{(2)}$ |
|---|---|
| 000 | 0 |
| 001 | 6 |
| 010 | 3 |
| 011 | 4 |
| 100 | 2 |
| 101 | 8 |
| 110 | 10 |
| 111 | 9 |

For a semi-persistently scheduled PUSCH transmission in the absence of a PDCCH with DCI format 0 in the same TB or for an initial PUSCH scheduled by a random access response grant in the same TB, $n_{DMRS}^{(2)}$ may be set to zero.

$n_{PRS}(n_s)$ may be computed by $$n_{PRS}(n_s) = \Sigma_{i=0}^{7} c(8N_{symb}^{UL} \cdot n_s + i) \cdot 2^i \quad [\text{Equation 20}]$$

where c(i) may be defined by [Equation 15] and the application of c(i) may be cell-specific. The pseudo-random sequence generator may be initialized with $$c_{init} = \left\lfloor \frac{N_{ID}^{cell}}{30} \right\rfloor \cdot 2^5 + f_{ss}^{PUSCH}$$

at the beginning of each radio frame.

The DMRS sequence $r^{PUSCH}(\cdot)$ is multiplied by an amplitude scaling factor $\beta_{PUSCH}$ and mapped in sequence starting with $r^{PUSCH}(0)$ to the same physical RBs used for a corresponding PUSCH transmission. The DMRS sequence is mapped to a $4^{th}$ SC-FDMA symbol (SC-FDMA symbol 3) for a normal CP and to a $3^{rd}$ SC-FDMA symbol (SC-FDMA symbol 2) for an extended CP.

Orthogonal Cover Codes (OCCs) may be applied to DMRS sequences. The OCCs are mutually orthogonal codes applicable to sequences. Although a plurality of channels can be identified usually by means of different sequences, they may be also distinguished from one another by OCCs. OCCs may have the following usages.

1) OCCs may be used in order to increase the capacity of radio resources allocated to uplink RSs, that is, DMRSs. For example, when a cyclic shift a is allocated to DMRSs transmitted in first and second slots, a negative-signed (−) DMRS may be allocated to the second slot. That is, a first UE may transmit a positive-signed (+) DMRS with the cyclic shift a in the second slot, whereas a second UE may transmit a negative-signed (−) DMRS with the cyclic shift a in the second slot.

Thus the eNB may estimate the channel of the first user by adding the DMRSs in the first and second slots, and the channel of the second user by subtracting the DMRS of the first slot from the DMRS of the second slot. That is, the eNB can identify the DMRS of the first user from the DMRS of the second user by means of OCCs. Accordingly, as at least two UEs use the same DMRS sequence with different OCCs, the capacity of radio resources can be doubled.

For transmission of a DMRS to which an OCC is applied, a field indicating the used OCC may be included in a downlink control signal. For instance, on the assumption that a 1-bit OCC indicator field is allocated to a downlink control signal, the OCC indicator may have the following configuration.

TABLE 5

| | $1^{st}$ slot | $2^{nd}$ slot |
|---|---|---|
| 0 | 1 | 1 |
| 1 | 1 | −1 |

Referring to Table 5, if the OCC indicator is set to 0, the DMRS of the second slot is positive-signed (+) and if the OCC indicator is set to 0, the DMRS of the second slot is negative-signed (−).

2) OCCs may be used to increase the spacing between cyclic shifts allocated to multiple antennas or layers of a single user. While the following description is given of cyclic shifts allocated to multiple layers, the same thing applies to cyclic shifts allocated to multiple antennas.

As described above, different channels are identified by different DMRS cyclic shifts. In a multi-antenna system, different cyclic shift values may be allocated to DMRSs of different layers to distinguish the layers from one another. As the number of layers increases, the number of cyclic shift values to be allocated should also increase. The resulting reduction of the spacing between cyclic shifts makes it difficult to distinguish a plurality of channels, thus decreasing channel estimation performance.

To avert this problem, an OCC may be applied to each layer. For example, if for four antennas, the DMRS cyclic shift offsets of the respective layers are 0, 6, 3 and 9, the spacing between the cyclic shifts of RSs for the layers is 3. Herein, the spacing between RS cyclic shifts for layers using the same OCC can be increased to 6 by applying negative-signed OCCs to third and fourth layers. If DMRS sequences of length N, (S01, . . . , S0N), (S61, . . . , S6N), (S31, . . . , S3N), (S91, . . . , S9N) are allocated to the first to fourth layers in the first slot, respectively, DMRS sequences applied to the first to fourth layers in the second slot are (S01, . . . , S0N), (S61, . . . , S6N), (−S31, . . . , −S3N), (−S91, . . . , −S9N). When the DMRS sequences of the two slots are summed, only the DMRSs of the first and second layers remain with a cyclic shift spacing of 6. Likewise, subtraction of the DMRS sequences of the second slot from the DMRS sequences of the first slot result only in the DMRSs of the third and fourth layers with a cyclic shift spacing of 6. Therefore, the channel estimation performance can be increased.

Similarly, on the assumption that DMRS cyclic shift offsets 0, 6 and 3 are allocated to three layers, respectively, the cyclic shift spacing between DMRSs of the layers is 3. The DMRS cyclic shift spacing can be increased to 6 by applying a negative-signed OCC to the third layer. That is, given (S01, . . . , S0N), (S61, . . . , S6N), (S31, . . . , S3N) as the DMRS sequences of the first, second and third layers in the first slot, (S01, . . . , S0N), (S61, . . . , S6N), (−S31, . . . , −S3N) are used as the DMRS sequences of the first, second and third layers in the second slot. When the DMRS sequences of the two slots are summed, only the DMRSs of the first and second layers remain with a cyclic shift spacing of 6. Likewise, subtraction of the DMRS sequences of the second slot from the DMRS sequences of the first slot results only in the DMRSs of the third layer remain. Therefore, the channel estimation performance can be increased.

3) OCCs may be applied to increase the spacing between cyclic shifts allocated to a single user. In a Multi-User MIMO (MU-MIMO) system with a plurality of users each using a plurality of antennas, OCCs may be applied to cyclic shifts. For example, highly dispersive cyclic shifts may be allocated to a plurality of antennas or layers from the viewpoint of a single user. From the viewpoint of multiple users, however, the spacing between cyclic shifts of users may be narrowed. This problem can be overcome by means of OCCs. When OCCs are applied, the same cyclic shift value may be allocated to a plurality of users according to an OCC type.

Table 6 lists exemplary OCCs for four antennas or four layers.

TABLE 6

| | Types | | | | | | | |
|---|---|---|---|---|---|---|---|---|
| | Type 1 | | Type 2 | | Type 3 | | Type 4 | |
| Layer/Antenna | A | B | A | B | A | B | A | B |
| 1 | (1, 1) | (1, −1) | (1, 1) | (1, −1) | (1, 1) | (1, −1) | (1, 1) | (1, −1) |
| 2 | (1, 1) | (1, −1) | (1, 1) | (1, −1) | (1, −1) | (1, 1) | (1, −1) | (1, 1) |
| 3 | (1, 1) | (1, −1) | (1, −1) | (1, 1) | (1, 1) | (1, −1) | (1, −1) | (1, 1) |
| 4 | (1, 1) | (1, −1) | (1, −1) | (1, 1) | (1, −1) | (1, 1) | (1, 1) | (1, −1) |

In Table 6, (a, b) represents OCCs applied to ($1^{st}$ slot, $2^{nd}$ slot) or ($2^{nd}$ slot, $1^{st}$ slot). A 1-bit OCC type field indicating an OCC type may be added to a downlink control signal that specifies a cyclic shift value. Table 7 illustrates an exemplary OCC type field.

TABLE 7

| Codeword of OCC | Type |
|---|---|
| 0 | A (/B) |
| 1 | B (/A) |

Referring to Table 7, if the OCC type field is set to 0, this means that OCCs of Type A (or Type B) in Table 6 is applied. If the OCC type field is set to 1, this means that OCCs of Type B (or Type A) in Table 6 is applied.

From Type 1-B in Table 6, it is noted that RSs are negative-signed for all layers or antennas in one slot. As a result of this OCC application, OCCs may be applied to some users, not to other users. OCCs may be utilized as resources or to widen the spacing between the cyclic shifts of multiple users.

In Type 2-A of Table 6, RSs are negative-signed for some layers or antennas in one slot. Specifically, Type 2-A allocates negative-signed RSs to the third and four layers (or antennas). OCCs may be utilized as resources or to widen the spacing between the cyclic shifts of multiple users.

Table 8 illustrates an example of applying OCCs of Type 2 to two UEs.

TABLE 8

| | $1^{st}$ Slot | $2^{nd}$ Slot |
|---|---|---|
| UE 1 | 0 6 3 9 | 0 6 −3 −9 |
| UE 2 | 4 10 | 4 10 |

UE 1 transmits DMRSs for four layers and UE 2 transmits DMRSs for two layers. According to Type 2-A, OCCs are applied to UE 1 and UE 2. Therefore, DMRSs of the third and fourth layers are negative-signed for UE 1 and DMRSs of the first and second layers are positive-signed for UE 2.

According to Type 3-A in Table 6, RSs are negative-signed for some layers or antennas in one slot. Specifically, Type 3-A allocates negative-signed RSs to the second and four layers (or antennas). OCCs may be utilized as resources or to widen the spacing between the cyclic shifts of multiple users.

According to Type 4-A in Table 6, RSs are negative-signed for some layers or antennas in one slot. Specifically, Type 4-A allocates negative-signed RSs to the second and third layers (or antennas). OCCs may be utilized as resources or to widen the spacing between the cyclic shifts of multiple users.

As described above, the present LTE-A standard specification defines $n_{DMRS}^{(2)}$ and an OCC value $[w^{(\lambda)}(0)\ w^{(\lambda)}(1)]$ according to a cyclic shift field included in a DCI format (i.e. an uplink grant) as illustrated in Table 9, for DMRS transmission through multiple antennas. Particularly, Table 9 is an extension of Table 4. $[w^{(\lambda)}(0)\ w^{(\lambda)}(1)]$ is an OCC value for layer index $\lambda$, where $w^{(\lambda)}(0)$ is an OCC value applied to the first slot for layer index $\lambda$ and $w^{(\lambda)}(1)$ is an OCC value applied to the second slot for layer index $\lambda$.

DCI associated with the latest uplink grant according to the present invention (reset scheme). If the number of retransmission TBs or codewords is equal to the number of initially transmitted TBs or codewords, the same cyclic shift values and OCCs allocated to layers for initial transmission may be allocated to the layers for retransmission. On the other hand, if fewer TBs or codewords than initially transmitted TBs or codewords are to be retransmitted, a cyclic shift value and an OCC are newly allocated to each layer for retransmission according to the value of the cyclic shift field of DCI associated with the latest uplink grant.

That is, the new cyclic shift value and OCC application rule of Table 9 is applied based on a DMRS cyclic shift value allocated by the latest uplink grant. Preferably, the latest uplink grant has the same HARQ process ID.

It is assumed herein that two codewords are initially transmitted and only one of the two codewords is to be retransmitted. Instead of a cyclic shift value and an OCC used for the initial transmission, a new cyclic shift value and OCC are allocated to each layer based on a value indicated by the cyclic shift field of the latest uplink grant, referring to Table 9, in such a manner that the spacing between cyclic shifts allocated to layers corresponding to the retransmission codeword is maximized.

TABLE 9

| Cyclic Shift Field in uplink-related DCI format | $n_{DMRS,\lambda}^{(2)}$ | | | | $[w^{(\lambda)}(0)\ w^{(\lambda)}(1)]$ | | | |
|---|---|---|---|---|---|---|---|---|
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] |

Based on the above description, the present invention provides a method for allocating a cyclic shift value and an OCC to a layer for retransmission in case of multi-antenna DMRS transmission. More specifically, the present invention provides a method for, when a particular TB or codeword is to be retransmitted, allocating a cyclic shift value and an OCC for retransmission of the TB or codeword in order to solve problems encountered with retransmission from a UE.

Particularly, the present invention is limited to a case where a retransmission message is received on a PHICH. Since retransmission is triggered through the PHICH, an eNB just notifies a UE of an ACK/NACK for two TBs in PHICH resources, without transmitting an uplink grant for retransmission to the UE on a PDCCH. Therefore, a cyclic shift value or an OCC for retransmission is not separately signaled to the UE. Accordingly, there exists a need for a method for allocating a cyclic shift value and an OCC to each of associated layers for efficient DMRS transmission during retransmission.

Although the cyclic shift value and OCC allocated to each layer during initial transmission may be reused during retransmission (reuse scheme), a maximum spacing cannot be maintained between cyclic shifts when only a second codeword is retransmitted in case of two codeword-to-three layer mapping.

Therefore, for a particular TB or codeword requiring retransmission, a cyclic shift value and an OCC is initialized for each layer based on a value set in the cyclic shift field of For example, N-layer transmission is indicated by the latest uplink grant and a UE attempts to transmit data through N layers. Then the UE monitors reception of an ACK/NACK for transmitted TBs on a PHICH. If the PHICH indicates retransmission of one TB, the UE attempts rank-1 or rank-2 transmission. $n_{DMRS}^{(2)}$ is allocated to a first layer based on a cyclic shift value acquired from the cyclic shift field of the latest uplink grant. In case of rank-2 transmission, a cyclic shift value is determined for a second layer using a preset offset, for example, an offset of 6 with respect to the cyclic shift value of the first layer. As a result, the first layer has an offset of 0 with respect to $n_{DMRS}^{(2)}$ and the second layer has an offset of 6 with respect to $n_{DMRS}^{(2)}$. In this manner, cyclic shift values with a maximum spacing can be allocated to layers during retransmission.

In another example, it is assumed that cyclic shift values with offsets of 0, 6 and 3 with respect to $n_{DMRS}^{(2)}$ are allocated to layers, respectively, in case of two codeword-to-three layer mapping. Then, a cyclic shift with an offset of 0 with respect to $n_{DMRS}^{(2)}$ is allocated to a first layer to which a first codeword is mapped, and cyclic shifts with offsets of 6 and 3 with respect to $n_{DMRS}^{(2)}$ are allocated respectively to second and third layers to which a second codeword is mapped. Notably, an OCC value [1 1] is allocated to the second layer and an OCC value [1 −1] is allocated to the third layer according to Table 9. Therefore, a cyclic shift spacing of 6 can be maintained.

In the case where the same cyclic shift values used for initial transmission are reused for retransmission, that is, the reuse scheme is employed, if only the second codeword is to be retransmitted, the cyclic shifts with the offsets of 6 and 3 with respect to $n_{DMRS}^{(2)}$ are allocated and only the OCC [1 1] is allocated. Therefore, the cyclic shift spacing between the two layers is 3, thus not ensuring a maximum spacing despite rank-2 transmission.

Compared to the reuse scheme, even when only the second codeword is to be transmitted, the reset scheme allocates cyclic shifts with offsets of 0 and 6 with respect to $n_{DMRS}^{(2)}$ to the layers, thereby maximizing the cyclic shift spacing despite allocation of the OCC [1 1] in the reset scheme. Consequently, channel estimation performance can be increased.

In the case where retransmission or non-retransmission is indicated by a PHICH, OCC allocation to each layer may be considered in two ways, namely allocation of an OCC corresponding to a cyclic shift value allocated to each layer according to Table 9 and allocation of an OCC to each layer irrespective of a cyclic shift value allocated to the layer.

For example, OCCs may be configured for DMRS sequences generated by cyclic shift values in such a manner that DMRS sequences generated by cyclic shifts 0 and 6 are positive-signed (i.e. +1) in both first and second slots and DMRS sequences generated by cyclic shifts 3 and 9 are positive-signed (i.e. +1) in the first slot and negative-signed (i.e. −1) in the second slot. That is, if cyclic shifts 0 and 6 or cyclic shifts 3 and 9 are allocated to two layers, the DMRS sequences are positive-signed (i.e. +1) in the first slot, and positive-signed (i.e. +1) for the cyclic shifts 0 and 6 and negative-signed (i.e. −1) for the cyclic shifts 3 and 9 in the second slot.

A case where an OCC is determined for each layer regardless of the cyclic shift of the layer will be described below. In the case where DMRS sequences are always positive-signed (i.e. +1) in the first and second slots for the first layer and positive-signed (i.e. +1) in the first slot and negative-signed (i.e. −1) in the second slot for the second layer, it is assumed that cyclic shifts 0 and 6 are allocated to the first and second layers, respectively. Then, regardless of the cyclic shift of each layer, the DMRS sequences of the first layer may be configured to be positive-signed always in the first and second slots, whereas the DMRS sequences of the second layer may be configured to be positive-signed in the first slot and negative-signed in the second slot. Alternatively or additionally, in rank-2 transmission, DMRS sequences may be set to be positive-signed or negative-signed in the second slot for the first and second layers.

Figure 16:
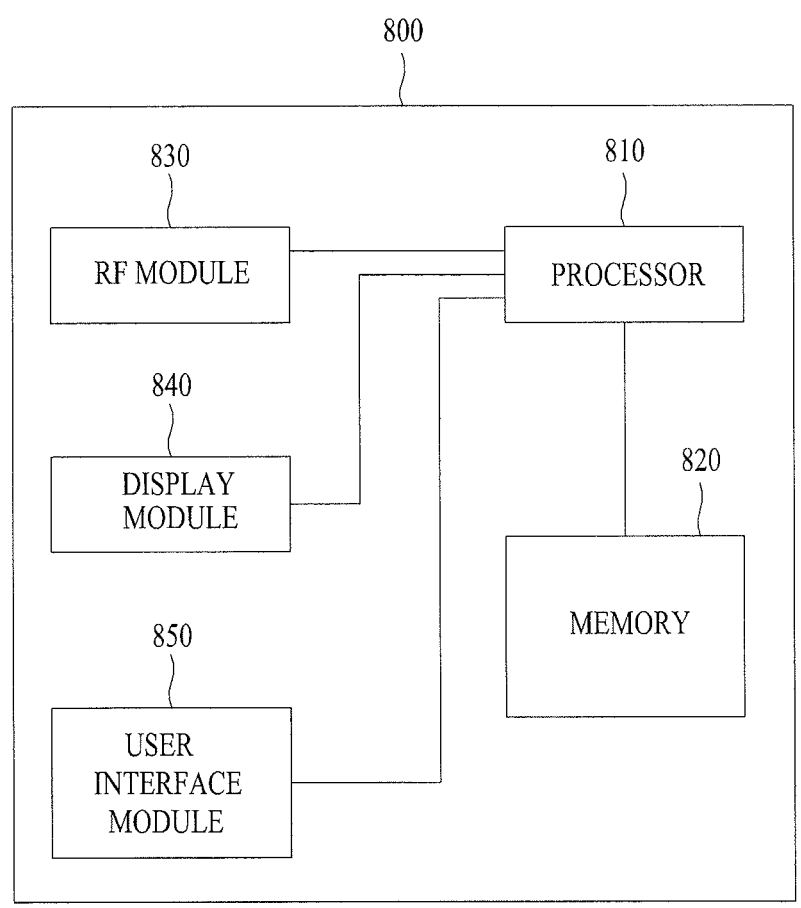
FIG. 16 is a block diagram of a communication transceiver according to an embodiment of the present invention.

FIG. 16 is a block diagram of a communication transceiver according to an embodiment of the present invention. The transceiver may be a part of an eNB or a UE.

Referring to FIG. 16, a transceiver 800 includes a processor 810, a memory 820, a Radio Frequency (RF) module 830, a display module 840, and a user interface module 850.

The configuration of the transceiver 800 illustrated in FIG. 16 is purely exemplary. Thus a module may be omitted from the transceiver 800 or a necessary module may be added to the transceiver 800. In addition, a certain module of the transceiver 800 may be divided into a plurality of modules. The processor 810 is adapted to perform operations according to the embodiments of the present invention described before with reference to the drawings.

More specifically, if the transceiver 800 is a part of an eNB, the processor 810 may generate a control signal and map the control signal to a control channel configured with a plurality of frequency blocks. If the transceiver 800 is a part of a UE, the processor 810 may detect a control channel destined for the UE from a signal received in a plurality of frequency blocks and extract a control signal from the control channel.

Then the processor 810 may perform a necessary operation based on the control signal as described before with reference to FIGS. 1 to 15.

The memory 820 is connected to the processor 810 and stores an operating system, applications, program code, data, etc. The RF module 830 is connected to the processor 810 and upconverts a baseband signal to an RF signal or downconverts an RF signal to a baseband signal. For this purpose, the RF module 830 performs analog conversion, amplification, filtering, and frequency upconversion, or performs these operations reversely. The display module 840 is connected to the processor 810 and displays various types of information. The display module 840 may be configured using, but not limited to, a Liquid Crystal Display (LCD), a Light Emitting Diode (LED), an Organic Light Emitting Diode (OLED), etc. The user interface module 850 is connected to the processor 810 and may be configured into a combination of known user interfaces such as a keypad, a touch screen, etc.

As is apparent from the above description of the embodiments of the present invention, a UE can effectively transmit an uplink RS to a BS in a wireless communication system.

The present invention is applicable to a wireless communication system, particularly to a method and apparatus for transmitting an uplink RS at a UE in a multi-antenna wireless communication system.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description has been mainly made of a data transmission and reception relationship between a BS and a UE. A specific operation described as being performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNB or eNode B, an access point, etc. The term 'UE' may be replaced with a Mobile Station (MS), a Subscriber Station (SS), a Mobile Subscriber Station (MSS), etc.

The embodiments of the present invention may be achieved by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for transmitting signals at a User Equipment (UE) in a multi-antenna wireless communication system, the method comprising:
  receiving, by the UE from a Base Station (BS), a first uplink grant indicating a number of transport blocks and a number of layers for the transport blocks;
  calculating, by the UE, resources of a Reference Signal (RS) for the transport blocks based on a cyclic shift field included in the first uplink grant;
  transmitting, by the UE to the BS, the transport blocks and the RS for the transport blocks using the calculated resources of the RS;
  receiving, by the UE from the BS, Negative ACKnowledgment (NACK) information for at least one of the transport blocks for retransmission;
  if a second uplink grant for retransmission is not received from the BS and if a number of the at least one of the transport blocks for retransmission is not equal to the number of transport blocks indicated by the first uplink grant, recalculating, by the UE, the resources of the RS for the at least one of the transport blocks for retransmission based on the cyclic shift field included in the first uplink grant and a number of layers of the at least one of the transport blocks for retransmission; and
  retransmitting, by the UE to the BS, the at least one of the transport blocks for retransmission and the RS for the at least one of the transport blocks for retransmission using the recalculated resources of the RS,
  wherein the resources of the RS comprise a cyclic shift value and an Orthogonal Cover Code (OCC) value.

2. The method according to claim 1, further comprising:
  if the second uplink grant for retransmission is received from the BS, calculating, by the UE, the resources of the RS for the at least one of the transport blocks for retransmission based on the cyclic shift field included in the second uplink grant; and
  retransmitting, by the UE to the BS, the at least one of the transport blocks for retransmission and the RS for the at least one of the transport blocks for retransmission using the calculated resources of the RS.

3. The method according to claim 2, wherein the first uplink grant and the second uplink grant are received through a Physical Downlink Control Channel (PDCCH), and the NACK information is received through a Physical Hybrid ARQ Indicator CHannel (PHICH).

4. The method according to claim 1, wherein a value of the cyclic shift field ranges from 0 to 11.

5. A User Equipment (UE) configured to transmit signals in a multi-antenna wireless communication system, the UE comprising:
  a processor; and
  a memory containing instructions, which when executed by the processor, cause the UE to:
    receive, from a Base Station (BS), a first uplink grant indicating a number of transport blocks and a number of layers for the transport blocks,
    calculate resources of a Reference Signal (RS) for the transport blocks based on a cyclic shift field included in the first uplink grant,
    transmit, to the BS, the transport blocks and the RS for the transport blocks using the calculated resources of the RS,
    receive, from the BS, Negative ACKnowledgment (NACK) information for at least one of the transport blocks for retransmission,
    if a second uplink grant for retransmission is not received from the BS and if a number of the at least one of the transport blocks for retransmission is not equal to the number of transport blocks indicated by the first uplink grant, recalculate the resources of the RS for the at least one of the transport blocks for retransmission based on the cyclic shift field included in the first uplink grant and a number of layers of the at least one of the transport blocks for retransmission, and
    retransmit, to the BS, the at least one of the transport blocks for retransmission and the RS for the at least one of the transport blocks for retransmission using the recalculated resources of the RS,
    wherein the resources of the RS comprise a cyclic shift value and an Orthogonal Cover Code (OCC) value.

6. The UE according to claim 5, wherein the instructions, which when executed by the processor, further cause the UE to:
  calculate the resources of the RS for the at least one of the transport blocks for retransmission based on the cyclic shift field included in the second uplink grant if the second uplink grant for retransmission is received from the BS, and
  retransmit the at least one of the transport blocks for retransmission and the RS for the at least one of the transport blocks for retransmission using the calculated resources of the RS.

7. The UE according to claim 6, wherein the first uplink grant and the second uplink grant are received through a Physical Downlink Control Channel (PDCCH), and the NACK information is received through a Physical Hybrid ARQ Indicator CHannel (PHICH).

8. The UE according to claim 5, wherein a value of the cyclic shift field ranges from 0 to 11.

9. A method for receiving signals at a Base Station (BS) in a multi-antenna wireless communication system, the method comprising:
  transmitting, from the BS to a User Equipment (UE), a first uplink grant indicating a number of transport blocks and a number of layers for the transport blocks;
  receiving, by the BS from the UE, the transport blocks and a Reference Signal (RS) for the transport blocks based on the first uplink grant, wherein resources of the RS for the transport blocks are calculated based on a cyclic shift field included in the first uplink grant;
  transmitting, by the BS to the UE, Negative ACKnowledgment (NACK) information for at least one of the transport blocks for retransmission, wherein, if a second uplink grant for retransmission is not received by the UE and if a number of the at least one of the transport blocks for retransmission is not equal to the number of transport blocks indicated by the first uplink grant, the resources of the RS for the at least one of the transport blocks for retransmission are recalculated based on the cyclic shift field included in the first uplink grant and a number of layers of the at least one of the transport blocks for retransmission; and receiving, by the BS from the UE, the at least one of the transport blocks for retransmission and the RS for the at least one of the transport blocks for retransmission using the recalculated resources of the RS, wherein the resources of the RS comprise a cyclic shift value and an Orthogonal Cover Code (OCC) value.

10. The method according to claim 9, wherein, if the second uplink grant for retransmission is transmitted by the BS, the resources of the RS for the at least one of the transport blocks for retransmission are calculated based on the cyclic shift field included in the second uplink grant and the BS receives the at least one of the transport blocks for retransmission and the RS for the at least one of the transport blocks for retransmission using the calculated resources of the RS.

11. The method according to claim 10, wherein the first uplink grant and the second uplink grant are transmitted through a Physical Downlink Control Channel (PDCCH), and the NACK information is transmitted through a Physical Hybrid ARQ Indicator CHannel (PHICH).

12. The method according to claim 9, wherein a value of the cyclic shift field ranges from 0 to 11.

13. A Base Station (BS) configured to receive signals in a multi-antenna wireless communication system, the BS comprising:

a processor; and a memory containing instructions, which when executed by the processor, cause the BS to transmit, to a User Equipment (UE), a first uplink grant indicating a number of transport blocks and a number of layers for the transport blocks, receive, from the UE, the transport blocks and a Reference Signal (RS) for the transport blocks based on the first uplink grant, wherein resources of the RS for the transport blocks are calculated based on a cyclic shift field included in the first uplink grant, transmit, to the UE, Negative ACKnowledgment (NACK) information for at least one of the transport blocks for retransmission, wherein, if a second uplink grant for retransmission is not received by the UE and if a number of the at least one of the transport blocks for retransmission is not equal to the number of transport blocks indicated by the first uplink grant, the resources of the RS for the at least one of the transport blocks for retransmission are recalculated based on the cyclic shift field included in the first uplink grant and a number of layers of the at least one of the transport blocks for retransmission; and receive, from the UE, the at least one of the transport blocks for retransmission and the RS for the at least one of the transport blocks for retransmission using the recalculated resources of the RS, wherein the resources of the RS comprise a cyclic shift value and an Orthogonal Cover Code (OCC) value.

14. The BS according to claim 13, wherein, if the second uplink grant for retransmission is transmitted by the BS, the resources of the RS for the at least one of the transport blocks for retransmission are calculated based on the cyclic shift field included in the second uplink grant and the BS receives a retransmission of the at least one of the transport blocks for retransmission and the RS for the at least one of the transport blocks for retransmission using the calculated resources of the RS.

15. The BS according to claim 14, wherein the first uplink grant and the second uplink grant are transmitted through a Physical Downlink Control Channel (PDCCH), and the NACK information is transmitted through a Physical Hybrid ARQ Indicator CHannel (PHICH).

16. The BS according to claim 13, wherein a value of the cyclic shift field ranges from 0 to 11.

* * * * *